US009162380B2

(12) United States Patent
Jones et al.

(10) Patent No.: US 9,162,380 B2
(45) Date of Patent: *Oct. 20, 2015

(54) FORMING HIGHLY CONTOURED COMPOSITE PARTS

(71) Applicant: The Boeing Company, Chicago, IL (US)

(72) Inventors: Darrell D. Jones, Mill Creek, VA (US); Michael A. Lee, Kent, WA (US); Michael R. Anderson, Renton, WA (US); Joseph D. Brennan, Poway, CA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/045,797

(22) Filed: Oct. 4, 2013

(65) Prior Publication Data

US 2014/0037780 A1    Feb. 6, 2014

Related U.S. Application Data

(62) Division of application No. 12/258,404, filed on Oct. 25, 2008, now Pat. No. 8,557,165.

(51) Int. Cl.
   *B29C 43/58*    (2006.01)
   *B29C 33/30*    (2006.01)
   *B29C 45/80*    (2006.01)
   *B29C 70/46*    (2006.01)
   *B29L 31/00*    (2006.01)

(52) U.S. Cl.
   CPC ............... *B29C 43/58* (2013.01); *B29C 33/307* (2013.01); *B29C 33/308* (2013.01); *B29C 45/80* (2013.01); *B29C 70/462* (2013.01); *B29L 2031/003* (2013.01); *B29L 2031/008* (2013.01)

(58) Field of Classification Search
   CPC .. B29C 33/307; B29C 33/308; B29C 70/462; B29L 2031/003; B29L 2031/008
   USPC .............. 425/162, 394, 339, 342.1, 343, 389; 264/320
   See application file for complete search history.

(56) References Cited

U.S. PATENT DOCUMENTS

| 1,433,879 A | 10/1922 | Fancher et al. |
| 1,504,547 A | 8/1924 | Egerton |

(Continued)

FOREIGN PATENT DOCUMENTS

| CA | 2487697 A1 | 5/2006 |
| DE | 742682 C | 12/1943 |

(Continued)

OTHER PUBLICATIONS

Notice of Allowance, dated Nov. 26, 2013, regarding U.S. Appl. No. 13/090,746, 21 pages.

(Continued)

*Primary Examiner* — Alison Hindenlang
*Assistant Examiner* — Robert J Grun
(74) *Attorney, Agent, or Firm* — Yee & Associates, P.C.

(57) ABSTRACT

A method of forming a flat composite charge into a contoured composite part reduces wrinkles in the part as the charge is being formed. Dies are used to form a portion of charge to the steepest contour of the part, while tension is maintained on the charge as the remaining portions of the charge are formed.

19 Claims, 15 Drawing Sheets

(56) References Cited

U.S. PATENT DOCUMENTS

| | | |
|---|---|---|
| 1,965,716 A | 7/1934 | Thoms et al. |
| 2,750,629 A | 6/1956 | Georges |
| 2,981,976 A | 5/1961 | Maier |
| 3,376,184 A | 4/1968 | Ritchey et al. |
| 3,526,558 A | 9/1970 | Beeson |
| 3,693,924 A | 9/1972 | Blatherwick |
| 3,843,756 A | 10/1974 | Talbott et al. |
| 3,975,363 A | 8/1976 | Jones |
| 3,990,291 A | 11/1976 | Evertz et al. |
| 4,132,755 A | 1/1979 | Johnson |
| 4,254,735 A | 3/1981 | Postupack et al. |
| 4,270,964 A | 6/1981 | Flaskett |
| 4,338,070 A | 7/1982 | Nava |
| 4,366,698 A | 1/1983 | Gill |
| 4,367,644 A | 1/1983 | Kramer et al. |
| 4,411,148 A | 10/1983 | Aschauer et al. |
| 4,416,170 A | 11/1983 | Gibson et al. |
| 4,443,401 A | 4/1984 | Turner |
| 4,475,976 A | 10/1984 | Mittelstadt et al. |
| 4,504,341 A | 3/1985 | Radzwill et al. |
| 4,614,558 A | 9/1986 | Kobe |
| 4,657,717 A | 4/1987 | Cattanach et al. |
| 4,726,924 A | 2/1988 | Mittelstadt |
| 4,780,262 A | 10/1988 | VonVolkli |
| 4,902,215 A | 2/1990 | Seemann, III |
| 4,922,232 A | 5/1990 | Bosich |
| 4,933,232 A | 6/1990 | Trout et al. |
| 4,946,526 A | 8/1990 | Petty-Galis et al. |
| 4,961,700 A | 10/1990 | Dunbar |
| 5,015,168 A | 5/1991 | Boime et al. |
| 5,022,248 A | 6/1991 | Brooks et al. |
| 5,040,962 A | 8/1991 | Waszeciak et al. |
| 5,060,501 A | 10/1991 | Heath |
| 5,087,193 A | 2/1992 | Herbert, Jr. |
| 5,108,532 A | 4/1992 | Thein et al. |
| 5,129,813 A | 7/1992 | Shepherd |
| 5,152,949 A | 10/1992 | Leoni et al. |
| 5,178,812 A | 1/1993 | Sanford et al. |
| 5,188,787 A | 2/1993 | King et al. |
| 5,286,438 A | 2/1994 | Dublinski et al. |
| 5,292,475 A | 3/1994 | Mead et al. |
| 5,304,057 A | 4/1994 | Celerier et al. |
| 5,327,764 A | 7/1994 | Weykamp et al. |
| 5,366,431 A | 11/1994 | Smith et al. |
| 5,366,684 A | 11/1994 | Corneau, Jr. |
| 5,464,337 A | 11/1995 | Bernardon et al. |
| 5,582,058 A | 12/1996 | Knudson |
| 5,683,648 A | 11/1997 | Fortin |
| 5,690,973 A | 11/1997 | Kindt-Larsen et al. |
| 5,707,576 A | 1/1998 | Asher |
| 5,714,179 A | 2/1998 | Goodridge et al. |
| 5,772,950 A | 6/1998 | Brustad et al. |
| 5,824,255 A | 10/1998 | Ross et al. |
| 5,830,305 A | 11/1998 | Andersen et al. |
| 5,846,464 A | 12/1998 | Hoffman |
| 5,882,462 A | 3/1999 | Donecker et al. |
| 5,939,007 A | 8/1999 | Iszczyszyn et al. |
| 6,089,061 A | 7/2000 | Haas et al. |
| 6,139,942 A | 10/2000 | Hartness et al. |
| 6,159,414 A | 12/2000 | Tunis, III et al. |
| 6,245,275 B1 | 6/2001 | Holsinger |
| 6,269,677 B1 | 8/2001 | Torvinen et al. |
| 6,299,819 B1 | 10/2001 | Han |
| 6,495,086 B1 | 12/2002 | Uytterhaeghe et al. |
| 6,511,570 B2 | 1/2003 | Matsui |
| 6,558,590 B1 | 5/2003 | Stewart |
| 6,692,681 B1 | 2/2004 | Lunde |
| 6,723,272 B2 | 4/2004 | Montague et al. |
| 6,749,784 B2 | 6/2004 | Blanchon |
| 6,814,916 B2 | 11/2004 | Willden et al. |
| 6,823,578 B2 | 11/2004 | Anderson et al. |
| 6,843,953 B2 | 1/2005 | Filsinger et al. |
| 6,855,284 B2 | 2/2005 | Lanni et al. |
| 6,862,989 B2 | 3/2005 | Belanger et al. |
| 6,929,770 B2 | 8/2005 | Caldwell, Jr. |
| 6,967,000 B2 | 11/2005 | Vaara |
| 7,021,096 B2 | 4/2006 | Barnett |
| 7,091,300 B2 | 8/2006 | Luhmann et al. |
| 7,118,370 B2 | 10/2006 | Willden et al. |
| 7,126,496 B2 | 10/2006 | Greene |
| 7,132,161 B2 | 11/2006 | Knowles et al. |
| 7,141,199 B2 | 11/2006 | Sana et al. |
| 7,160,498 B2 | 1/2007 | Mataya |
| 7,306,450 B2 | 12/2007 | Hanson |
| 7,334,782 B2 | 2/2008 | Woods et al. |
| 7,429,172 B2 | 9/2008 | Chotard |
| 7,464,508 B2 | 12/2008 | Fournie et al. |
| 7,527,759 B2 | 5/2009 | Lee et al. |
| 7,601,421 B2 | 10/2009 | Khabashesku et al. |
| 7,622,066 B2 | 11/2009 | Brustad et al. |
| 7,655,168 B2 | 2/2010 | Jones et al. |
| 7,708,546 B2 | 5/2010 | Lee et al. |
| 7,824,171 B2 | 11/2010 | Hanson et al. |
| 7,951,318 B2 | 5/2011 | Hanson |
| 7,959,753 B2 | 6/2011 | Nunez Delgado et al. |
| 8,105,068 B2 | 1/2012 | Ross et al. |
| 8,557,165 B2 * | 10/2013 | Jones et al. .................. 264/320 |
| 2001/0045684 A1 | 11/2001 | Blanchon |
| 2002/0167119 A1 | 11/2002 | Hemphill |
| 2003/0104094 A1 | 6/2003 | Sloman |
| 2003/0205156 A1 | 11/2003 | Belanger et al. |
| 2003/0234471 A1 | 12/2003 | Kuroiwa et al. |
| 2004/0041304 A1 | 3/2004 | Willden et al. |
| 2004/0043196 A1 | 3/2004 | Willden et al. |
| 2004/0071870 A1 | 4/2004 | Knowles et al. |
| 2004/0145080 A1 | 7/2004 | Tanaka |
| 2004/0145095 A1 | 7/2004 | McCollum et al. |
| 2004/0219855 A1 | 11/2004 | Tsotsis |
| 2005/0051932 A1 | 3/2005 | Danzik |
| 2005/0059309 A1 | 3/2005 | Tsotsis |
| 2005/0073076 A1 | 4/2005 | Woods et al. |
| 2005/0086991 A1 | 4/2005 | Barnett |
| 2005/0142239 A1 | 6/2005 | Frank |
| 2005/0178083 A1 | 8/2005 | Fournie et al. |
| 2006/0017200 A1 | 1/2006 | Cundiff et al. |
| 2006/0068170 A1 | 3/2006 | Hanson |
| 2006/0071817 A1 | 4/2006 | Greene |
| 2006/0166003 A1 | 7/2006 | Khabashesku et al. |
| 2006/0231981 A1 * | 10/2006 | Lee et al. ...................... 264/320 |
| 2007/0175171 A1 | 8/2007 | Delgado et al. |
| 2007/0176323 A1 | 8/2007 | Jones et al. |
| 2008/0054523 A1 | 3/2008 | Hanson |
| 2008/0286564 A1 | 11/2008 | Tsotsis |
| 2009/0123588 A1 | 5/2009 | Lee et al. |
| 2009/0320292 A1 | 12/2009 | Brennan et al. |
| 2010/0068326 A1 | 3/2010 | Jones et al. |
| 2010/0074979 A1 | 3/2010 | Cundiff et al. |
| 2010/0102482 A1 | 4/2010 | Jones et al. |
| 2011/0195230 A1 | 8/2011 | Hanson |

FOREIGN PATENT DOCUMENTS

| | | |
|---|---|---|
| DE | 4234002 A1 | 4/1994 |
| DE | 19536675 C1 | 2/1997 |
| EP | 0659541 A1 | 6/1995 |
| EP | 1136239 A2 | 9/2001 |
| EP | 1393873 A2 | 3/2004 |
| EP | 1972428 A2 | 9/2008 |
| EP | 2133263 A2 | 12/2009 |
| FR | 2035314 A5 | 12/1970 |
| FR | 2162296 A1 | 7/1973 |
| FR | 2667013 A1 | 3/1992 |
| FR | 2771332 A1 | 5/1999 |
| FR | 2844472 A1 | 3/2004 |
| GB | 2139934 A | 11/1984 |
| JP | S6143542 A | 3/1986 |
| JP | 2001310798 A | 11/2001 |
| WO | WO2004025003 | 3/2004 |
| WO | WO2005095091 | 10/2005 |
| WO | WO2006014825 A1 | 2/2006 |
| WO | WO2006039124 A2 | 4/2006 |
| WO | WO2006048652 A1 | 5/2006 |
| WO | WO2006113048 A2 | 10/2006 |
| WO | WO2010047980 A1 | 4/2010 |

(56) References Cited

FOREIGN PATENT DOCUMENTS

OTHER PUBLICATIONS

European Search Report, dated Aug. 5, 2008, regarding Application No. EP08012344 (EP1972428), 6 pages.
European Search Report, dated Oct. 10, 2011, regarding Application No. EP09251515 (EP2133263), 2 pages.
International Search Report, dated Dec. 7, 2005, regarding Application No. PCT/US2005/026141 (WO2006014825), 3 pages.
International Search Report, dated May 19, 2006, regarding Application No. PCT/US2005/033279 (WO2006039124), 5 pages.
International Search Report, dated Oct. 16, 2006, regarding Application No. PCT/US2006/010825 (WO2006113048), 4 pages.
International Search Report, dated Jan. 27, 2010, regarding Application No. PCT/US2009/060245 (WO2010047980), 3 pages.
Ando et al., "Growing Carbon Nanotubes," Materials Today, Oct. 2004, vol. 7, No. 10, pp. 22-29.
Brittles, "New Developments in Resin Transfer Moulding," Proc. 19th International Composites Congress, Nov. 1994, pp. 11-26.
"A Composite Preform," IP.com Prior Art Database Technical Disclosure No. IPCOM000007326D, dated Mar. 14, 2002, http://www.ip.com/IPCOM/000007326, 4 pages.
Garcia et al., "Hybrid Carbon Nanotube-Composite Architectures," MTL Annual Research Report, Sep. 2006, p. 208.
"Growing Carbon Nanotubes Aligned With Patterns," NASA Tech Briefs No. NPO-30205, Oct. 2002, http://nasatech.com/Briefs/Oct02/NPO30205.html, 2 pages.
"The Longest Carbon Nanotubes You Have Ever Seen," http://www.spacemart.com/reports/The_Longest_Carbon_Nanotubes_You_Have_Ever_Seen_999.html, May 14, 2007, 1 page.
Musch et al., "Tooling With Reinforced Elastomeric Materials," Composites Manufacturing, 1992, vol. 3, No. 2, pp. 101-111.
"The Wondrous World of Carbon Nanotubes," http://students.chem.tue.nl/ifp03/Wondrous%20World%20of%20Carbon%20Nanotubes_Final.pdf, Feb. 27, 2003, pp. 1-23.
Office Action, dated Mar. 22, 2007, regarding U.S. Appl. No. 10/953,670, 19 pages.
Notice of Allowance, dated Jul. 31, 2007, regarding U.S. Appl. No. 10/953,670, 6 pages.
Office Action, dated Sep. 3, 2010, regarding U.S. Appl. No. 11/927,003, 14 pages.
Notice of Allowance, dated Feb. 2, 2011, regarding U.S. Appl. No. 11/927,003, 9 pages.
Office Action, dated Dec. 5, 2012, regarding U.S. Appl. No. 13/090,746, 38 pages.
Final Office Action, dated May 15, 2013, regarding U.S. Appl. No. 13/090,746, 19 pages.
Office Action, dated Apr. 4, 2008, regarding U.S. Appl. No. 10/899,660, 21 pages.
Final Office Action, dated Oct. 16, 2008, regarding U.S. Appl. No. 10/899,660, 17 pages.
Notice of Allowance, dated Jun. 22, 2009, regarding U.S. Appl. No. 10/899,660, 14 pages.
Office Action, dated May 11, 2012, regarding U.S. Appl. No. 12/576,759, 19 pages.
Final Office Action, dated Feb. 20, 2013, regarding U.S. Appl. No. 12/576,759, 41 pages.
Office Action, dated May 28, 2008, regarding U.S. Appl. No. 11/105,104, 14 pages.
Notice of Allowance, dated Jan. 7, 2009, regarding U.S. Appl. No. 11/105,104, 3 pages.
Supplemental Notice of Allowance, dated Feb. 12, 2009, regarding U.S. Appl. No. 11/105,104, 4 pages.
Office Action, dated May 27, 2009, regarding U.S. Appl. No. 12/354,856, 12 pages.
Notice of Allowance, dated Dec. 23, 2009, regarding U.S. Appl. No. 12/354,856, 8 pages.
Miscellaneous Communication, dated Mar. 2, 2010, regarding U.S. Appl. No. 12/354,856, 4 pages.
Office Action, dated Oct. 15, 2008, regarding U.S. Appl. No. 11/344,458, 22 pages.
Office Action, dated May 6, 2009, regarding U.S. Appl. No. 11/344,458, 6 pages.
Notice of Allowance, dated Sep. 28, 2009, regarding U.S. Appl. No. 11/344,458, 7 pages.
Supplemental Notice of Allowance, dated Oct. 30, 2009, regarding U.S. Appl. No. 11/344,458, 4 pages.
Supplemental Notice of Allowance, dated Nov. 12, 2009, regarding U.S. Appl. No. 11/344,458, 5 pages.
Office Action, dated Jan. 25, 2012, regarding U.S. Appl. No. 12/623,942, 17 pages.
Notice of Allowance, dated May 8, 2012, regarding U.S. Appl. No. 12/623,942, 7 pages.
Office Action, dated May 14, 2012, regarding U.S. Appl. No. 12/138,975, 12 pages.
Final Office Action, dated Nov. 9, 2012, regarding U.S. Appl. No. 12/138,975, 32 pages.
Office Action, dated Mar. 9, 2010, regarding U.S. Appl. No. 12/258,404, 9 pages.
Final Office Action, dated Aug. 27, 2010, regarding U.S. Appl. No. 12/258,404, 10 pages.
Final Office Action, dated Mar. 11, 2011, regarding U.S. Appl. No. 12/258,404, 8 pages.
Office Action, dated Jul. 20, 2011, regarding U.S. Appl. No. 12/258,404, 6 pages.
Final Office Action, dated Jan. 17, 2012, regarding U.S. Appl. No. 12/258,404, 7 pages.
Notice of Allowance, dated Jun. 10, 2013, regarding U.S. Appl. No. 12/258,404, 38 pages.
Office Action, dated Mar. 4, 2014, regarding U.S. Appl. No. 12/576,759, 14 pages.
Final Office Action, dated Sep. 26, 2014, regarding U.S. Appl. No. 12/576,759, 12 pages.
Notice of Allowance, dated Oct. 31, 2014, regarding U.S. Appl. No. 12/576,759, 7 pages.

* cited by examiner

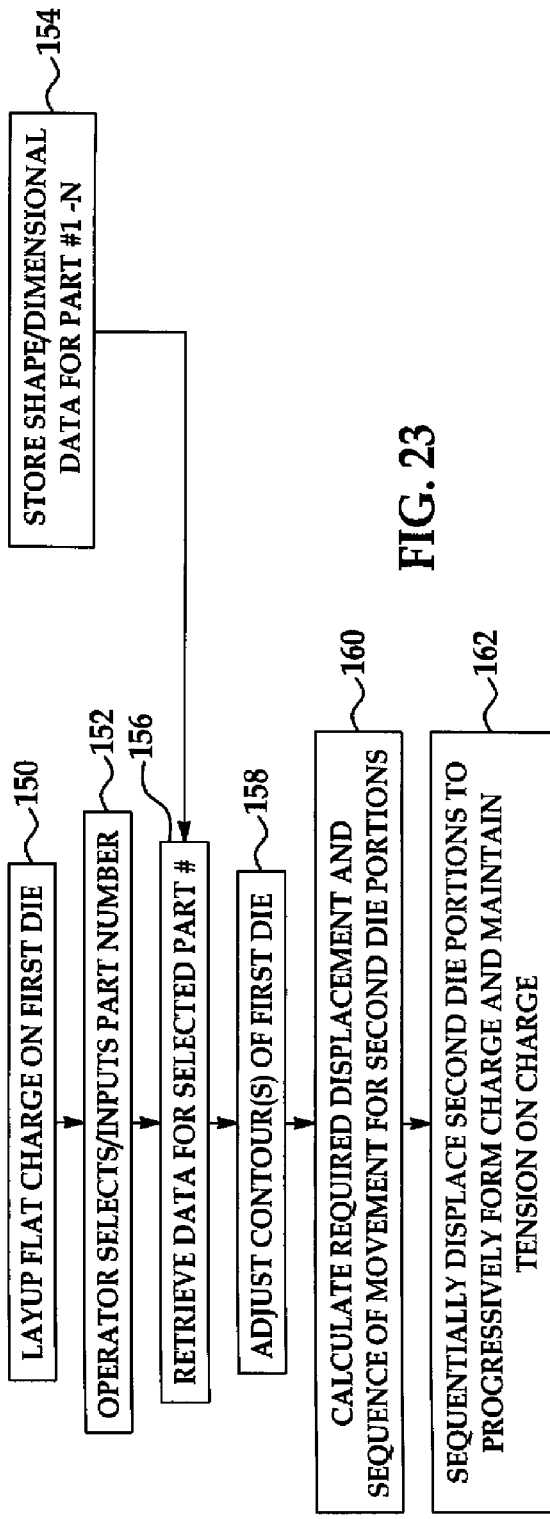
FIG. 22
FIG. 23
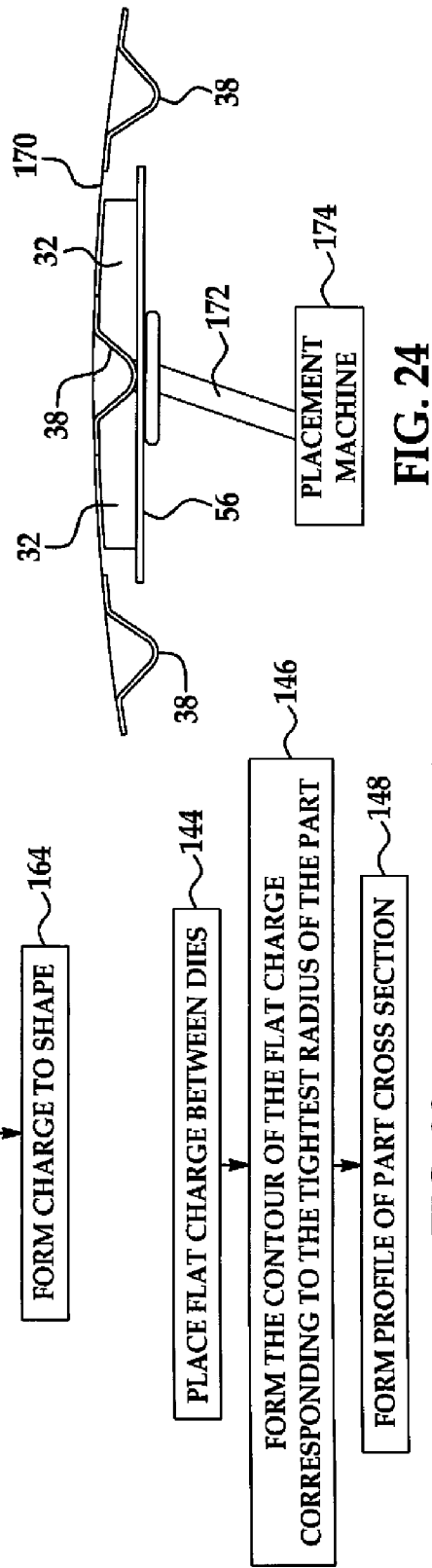
FIG. 24

FORMING HIGHLY CONTOURED COMPOSITE PARTS

This application is a divisional application of U.S. patent application Ser. No. 12/258,404, filed Oct. 25, 2008.

CROSS REFERENCE TO RELATED APPLICATIONS

This application is related to U.S. patent application Ser. No. 11/105,104 filed Apr. 13, 2005, and Ser. No. 12/138,975 filed Jun. 13, 2008, the entire disclosures of which are incorporated by reference herein.

TECHNICAL FIELD

This disclosure generally relates to the fabrication of composite parts, and deals more particularly with a method and apparatus for forming flat composite charges into highly contoured parts, especially contoured structural members.

BACKGROUND

Parts such as structural members formed from laminated composites may be fabricated using a flat multi-ply charge of prepreg materials. The charge may be formed into a desired part shape using a forming press having male and female dies that compress and form the charge into the desired shape, which is normally a straight or mildly contoured shape. Difficulty may be encountered, however, when attempting to form highly contoured structural members using dies as described above because of the tendency of the plies to form wrinkles as the charge is being compressed. Accordingly, the fabrication of highly contoured structural members using composites is generally limited to hand lay-up techniques in which each ply is laid up by hand over a die or other tool in order to reduce the possibility of wrinkling. This hand lay-up technique is labor intensive, and thus costly, as well as relatively slow.

A further problem with current techniques for forming highly contoured parts members is the limited flexibility of existing forming machines to accommodate differing part shapes that are highly contoured. Since the tooling normally has a permanent shape that may not be easily altered, separate tooling dies must be fabricated to accommodate differing part shapes.

Finally, existing solutions for forming highly contoured parts may require separate fixtures for forming, transporting and installing or placing the formed part on cure tooling or onto the surface of another laminate.

Accordingly, there is a need for a method and apparatus for forming highly contoured composite parts, especially structural members, that reduces or eliminates wrinkling during the forming process. There is also a need for apparatus for forming highly contoured parts that is easily reconfigurable to form parts having differing shapes and which may be used to transport and place the formed part.

SUMMARY

The disclosed embodiments provide a method and apparatus for forming highly contoured composite parts, especially elongate parts such as structural members, using a substantially flat composite charge that may comprise multiple plies of prepreg material. The apparatus includes mating dies having contour shapes that may be easily and automatically reconfigured to produce a variety of parts having various contours. One of the dies has multiple die portions that are independently controllable to progressively form the charge in a manner that maintains the charge in tension in order to reduce or eliminate wrinkling. Using digital controls and suitable algorithms, the apparatus may form a part from the bottom up or the top down, or any combination therebetween, thus assuring that the composite charge will be formed substantially without wrinkles regardless of whether the contouring is concave, convex or a combination of both concave and convex anywhere along the length of the part. The method may ensure that the plies of the charge are constantly being formed and moved to a larger radius of the contour, and thus kept in tension. One of the dies may be used to support the formed part during transportation and handling, and may also be used to assist in placing the part on a substrate such as a skin layup, thus eliminating the need for special tooling for transporting and placing the part.

In accordance with one disclosed embodiment, apparatus is provided for forming a composite charge into a contoured part, comprising: first and second dies between which the charge may be formed, the first die having a plurality of first die portions individually displaceable and forming a changeable die contour; a plurality of actuators for respectively displacing the first die portions; and a programmed controller for controlling the first actuators to displace the first die portions to form a desired contour. The first die may include a flexible die tray and a plurality of die portions mounted on the die tray. The first die includes a plurality of die portions controlled by actuators which change the contour of the first die. The second die includes a plurality of die portions also controlled by actuators which displace the die portions of the second die sequentially in order to progressively form the charge in a manner that maintains the charge in tension during the forming process.

According to another disclosed embodiment, apparatus for forming a composite charge into a contoured part, comprises: first and second dies between which the charge may be formed, the first die having a contour corresponding to the contour of the part to be formed, the second die including a plurality of die portions; and, means for closing the die portions of the second die against the first die in a predetermined sequence that substantially maintains tension on the composite charge as the charge is being formed.

According to a further embodiment, apparatus is provided for forming a composite charge into a shaped part, comprising: a forming machine for forming the composite charge; a portable carrier for transporting the shaped part away from the forming machine; first and second dies between which the charge may be formed, the first die being mounted on the forming machine, and the second die being mounted on the portable carrier; and, means for releasably coupling the portable carrier with the forming machine.

According to a disclosed method embodiment, forming a contoured composite part comprises: placing an essentially flat composite charge between first and second dies; keeping the first and second dies separated by the thickness of the flat charge and moving the first and second dies together to form the contour of the centerline of the charge without forming the cross section of the part, then moving the second die towards the first die to form the part cross section in convex curves and the first die towards the second die to form the part cross section in concave curves. An optional disclosed method embodiment; forming a contoured composite part comprises: placing an essentially flat composite charge between first and second dies using the first and second dies to form a portion of charge to the steepest contour of the part; and, using the first and second dies to form the remaining portions of the charge to other contours of the part, including maintaining tension on the charge as the remaining portions of the charge are formed.

According to a another disclosed method embodiment, reducing wrinkles in a composite charge as the charge is being formed into a part having a contour, comprises: forming a first portion of the charge to a tightest part of the contour; and, then, forming other portions of the charge to other parts of the contour, including maintaining tension on the charge as the other portions of the charge are being formed.

According to a further disclosed method, forming composite charges into contoured composite parts, comprises: storing a plurality of data files respectively containing contour data representing the contours of a plurality of parts; selecting a part to be formed; retrieving contour data from one of the data files for the selected part; using the retrieved contour data to calculate the relative displacement between two dies that will maintain tension of the charge as the charge is being formed; and forming the flat charge between the dies, including relatively displacing the dies according to the calculated displacement.

According to yet another method embodiment, a manufacturing method comprises: placing a first die in a forming machine; placing a second die on a portable carrier; coupling the portable carrier to the forming machine such that the first and second dies are in registration with each other; using the first and second dies to form a composite charge into a shaped part; uncoupling the portable carrier from the forming machine after the shaped part has been formed; and transporting the shaped part away from the forming machine using the portable carrier, including using the second die to support the shaped part as the shaped part is being transported.

The disclosed embodiments satisfy the need for a method and apparatus for forming highly contoured composite parts that is easily configurable to form various contours and reduces or eliminates wrinkles in the formed parts.

Other features, benefits and advantages of the disclosed embodiments will become apparent from the following description of embodiments, when viewed in accordance with the attached drawings and appended claims.

BRIEF DESCRIPTION OF THE ILLUSTRATIONS

FIG. 22 is a flow diagram broadly illustrating the disclosed method.

FIG. 23 is a flow diagram illustrating additional steps of the method illustrated in FIG. 22.

FIG. 24 is a side view illustrating the use of the die tray and second die to place a formed part on the surface of a laminate skin.

DETAILED DESCRIPTION

Figure 1:
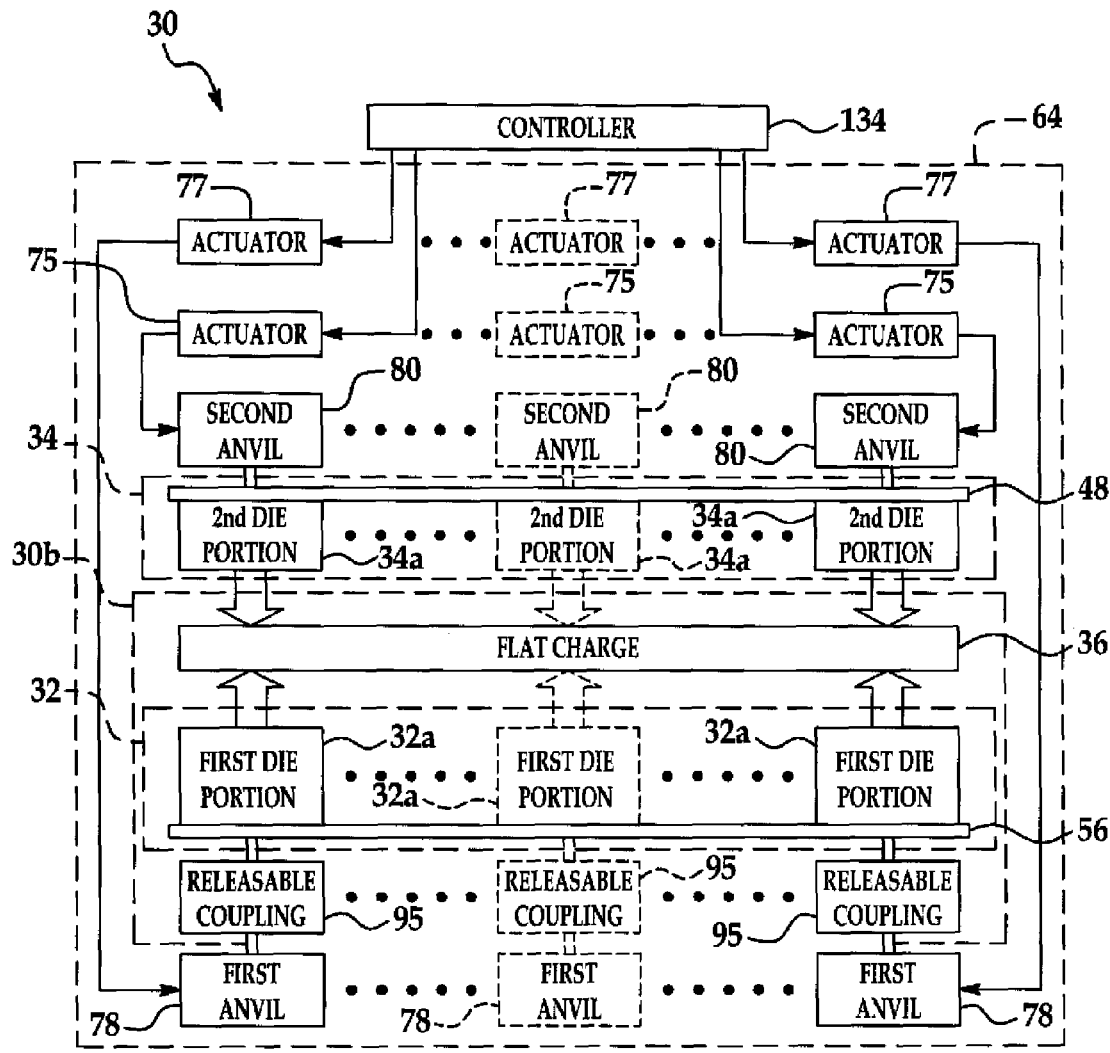
FIG. 1 is a functional block diagram of apparatus for forming highly contoured composite parts.

Referring first to FIG. 1, apparatus generally indicated by the numeral 30 may be used to form a substantially flat composite charge 36 into a contoured part (not shown). As used herein, "part" and "structural member" refer to a wide variety of contoured composite parts which, due to the relative severity of their contours, may be subject to wrinkling during the forming process. For convenience, the embodiments will be described in connection with the forming of a structural member, however, other elongate parts having curvatures or contours along their length may be formed according to the embodiments.

Figure 2:
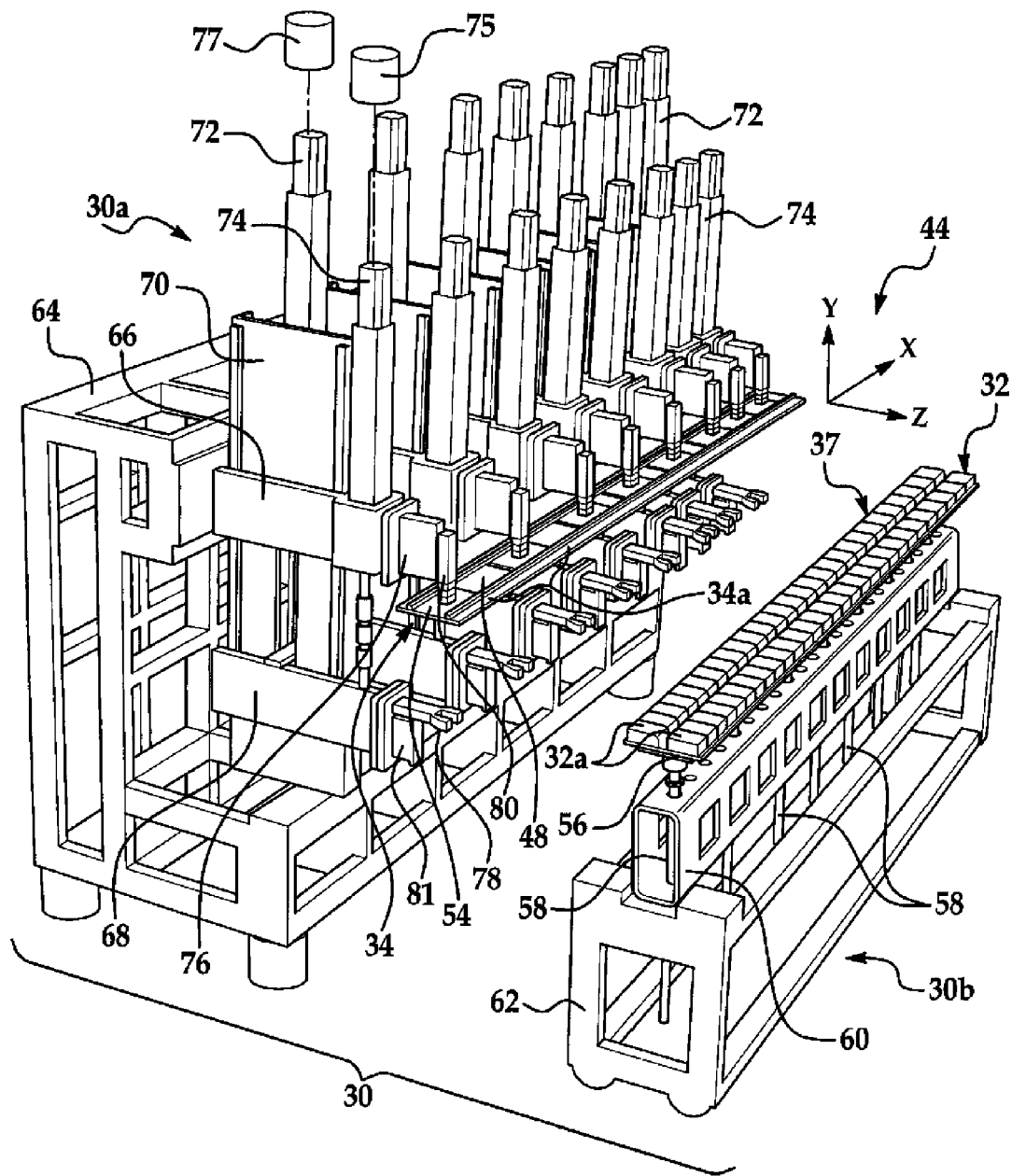
FIG. 2 is a perspective illustration of the apparatus shown in FIG. 1, wherein a portable carrier is shown uncoupled from the forming machine.
Figure 3:
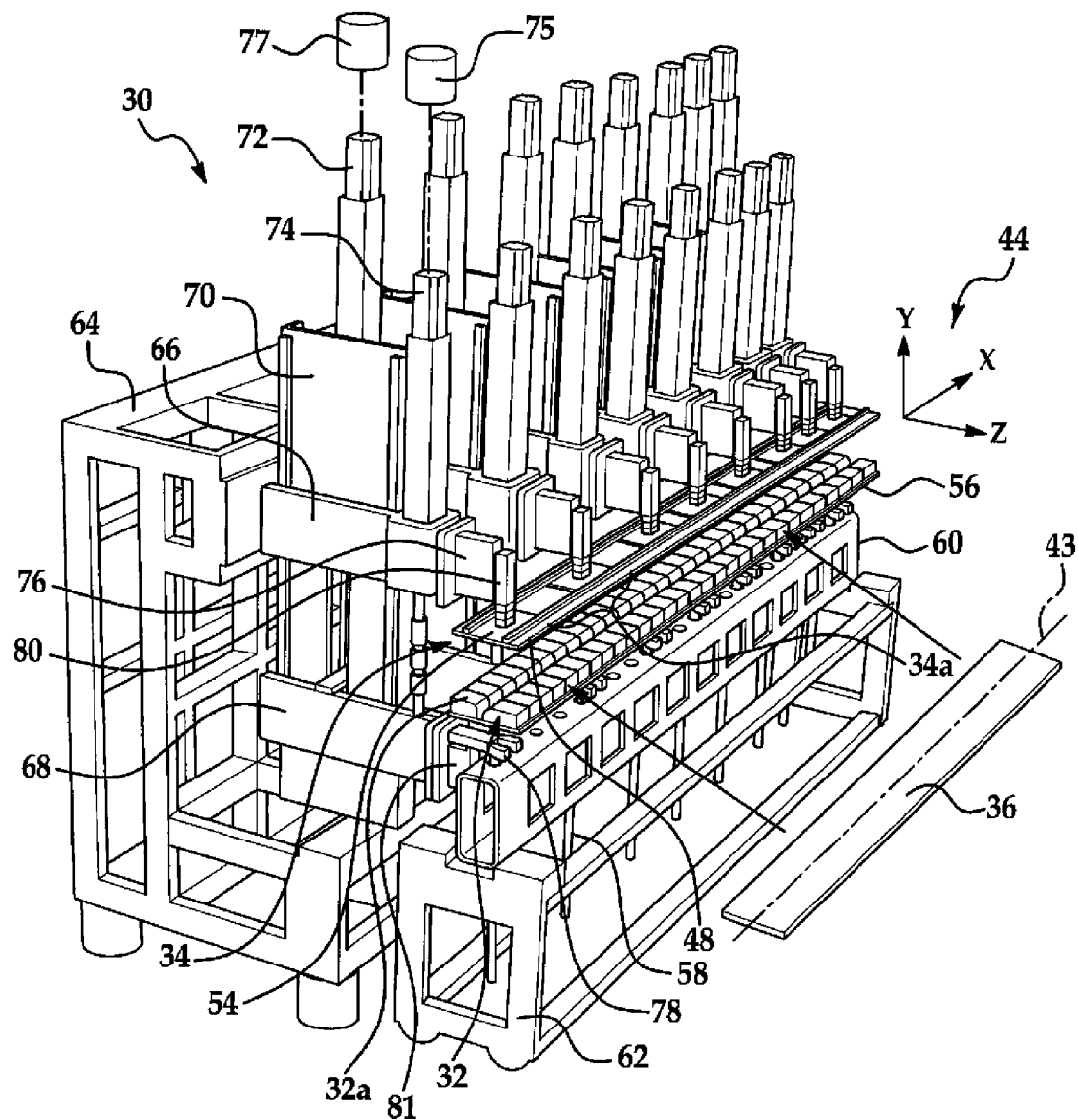
FIG. 3 is an illustration similar to FIG. 2 but showing the portable carrier coupled to the forming machine and the dies in an open position, ready to receive a flat composite charge.
Figure 4:
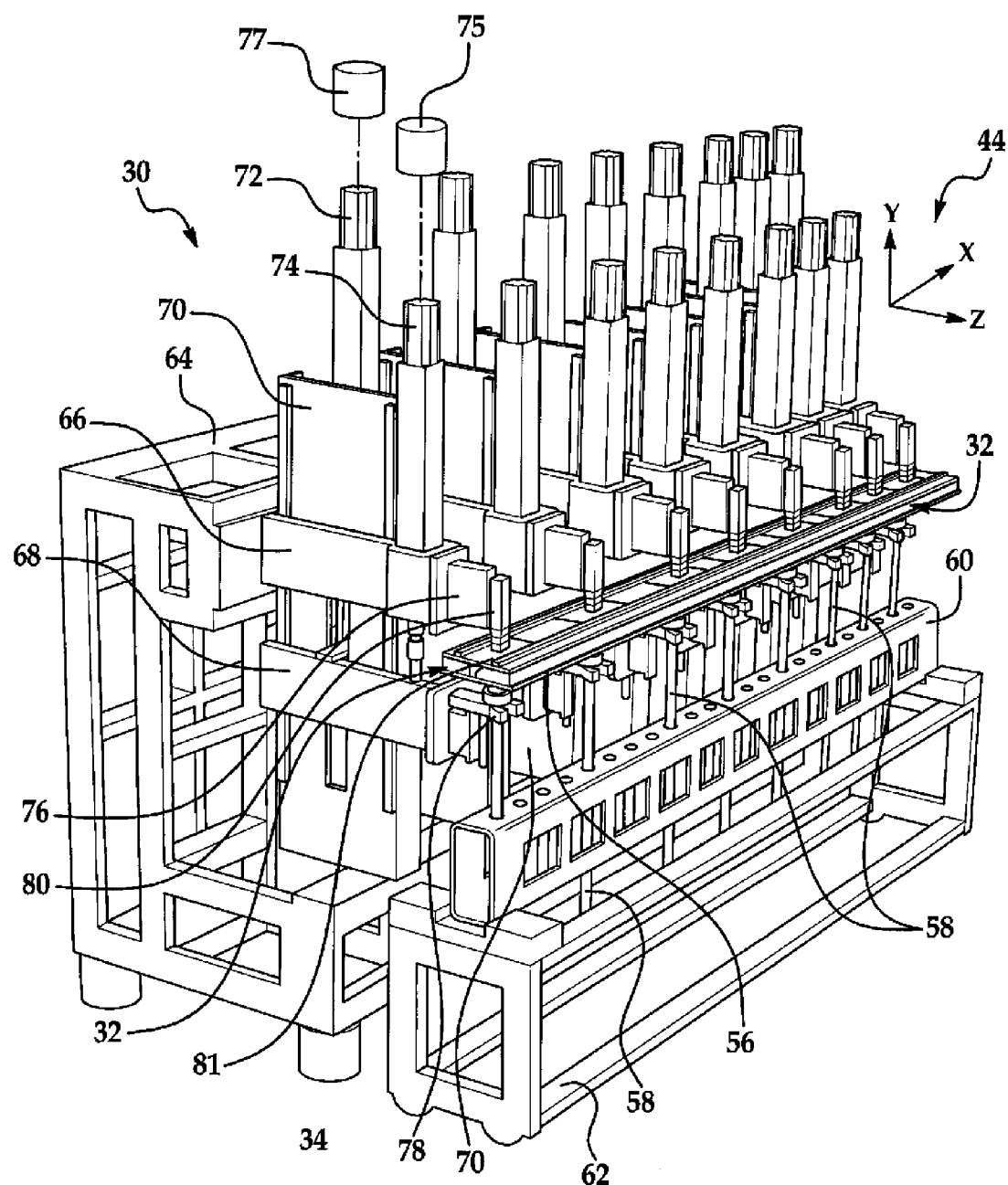
FIG. 4 is an illustration similar to FIG. 2 but showing the dies in a closed, forming position.
Figure 5:
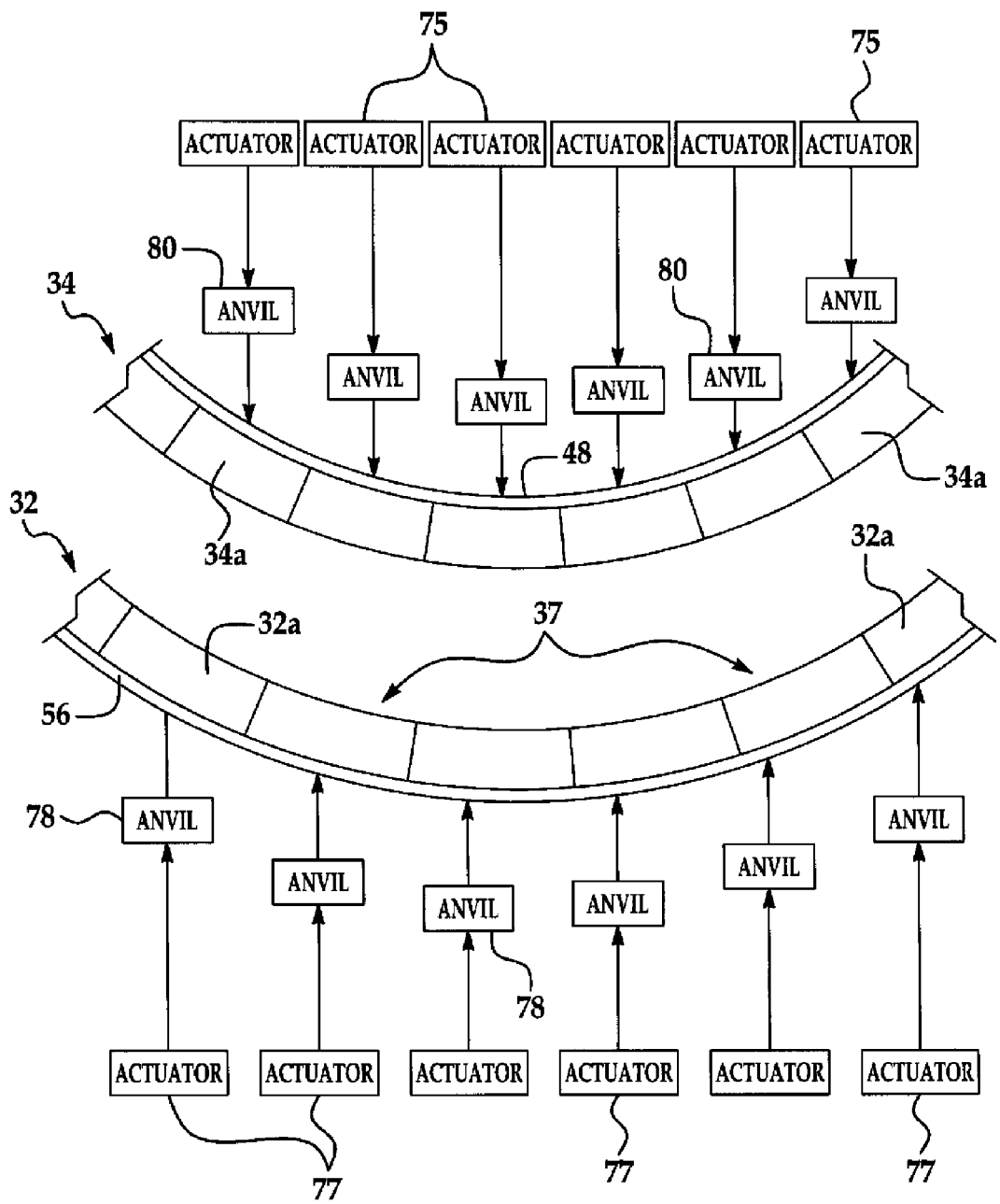
FIG. 5 is a diagrammatic illustration of components for changing the contour of the die and forming the charge.

The apparatus 30 broadly includes first and second dies 32, 34, respectively between which a flat composite charge 36 may be formed into a contoured part substantially free of wrinkles. The first die 32 includes a plurality of first die portions 32a that are independently displaceable relative to each other and react against a corresponding set of first anvils 78. The first die portions 32a collectively form a changeable die contour (FIGS. 2 and 5). Similarly, the second die 34 includes a plurality of independently displaceable second die portions 34a which react against a corresponding set of second anvils 80. The second die portions 34a are mounted on a flexible backing plate 48.

The first die 32 is supported on a flexible die tray 56 mounted on portable carrier 30b that is releasably coupled to the first anvils 78 by means of a releasable coupling 95. A set of contour control actuators 77 control the displacement of the first anvils 78, and thus control the independent displacement of the first die portions 32a to change the contour of the first die 32 along its length. A set of shape forming actuators 75 control displacement of the second anvils 80, and thus independently control the displacement of the second die portions 34a. Actuators 75, 77 are controlled by a programmed controller 134 which, as will be discussed later, uses operator inputs, an algorithm and part contour data to control the operation of the actuators 75, 77. Through the operation of the controller 134, the first die portions 32a may be individually displaced to collectively form a changeable die contour 37 (FIG. 5) corresponding to the part to be formed. Similarly, through operation of the controller 134, the second die portions 34a are individually displaced sequentially to form the flat charge 36 against the contoured first die 324 in a manner that maintains tension on the charge 36 throughout the forming process as the second die 34 is closed against the first die 32, thus reducing or eliminating wrinkles in the formed part.

Figure 6:
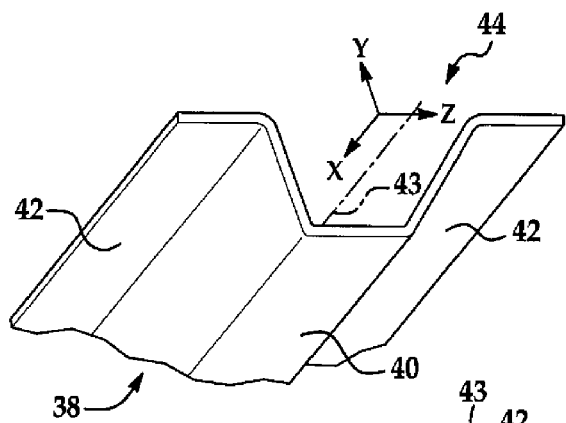
FIG. 6 is a perspective view of a hat shaped structural member formed by the apparatus shown in FIGS. 1-5.
Figure 7:
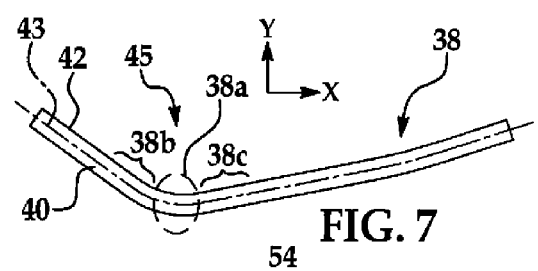
FIG. 7 is a side view of the structural member shown in FIG. 6.
Figure 8:
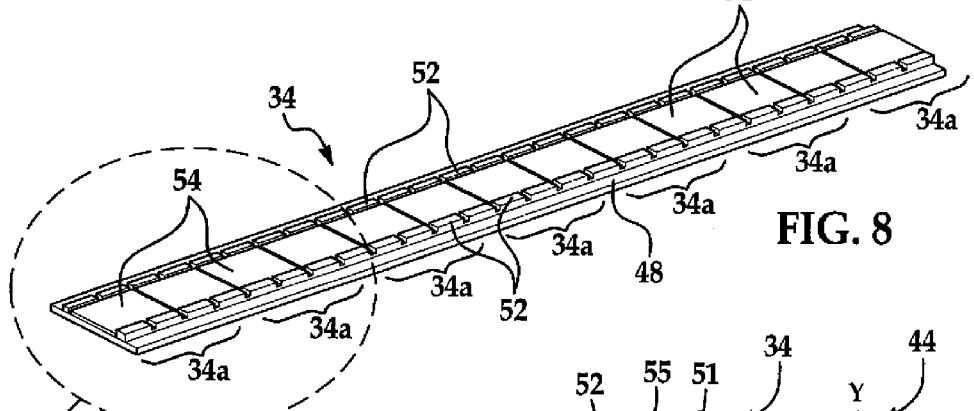
FIG. 8 is a perspective illustration of the backing plate for the first die.
Figure 9:
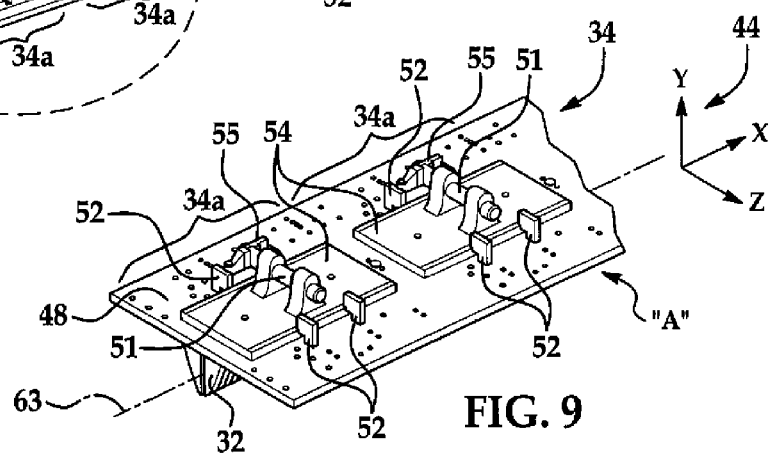
FIG. 9 is an enlarged view of the area designated as "A" in FIG. 8 and showing further details of the backing plate.

FIGS. 2-5 illustrate additional details of the apparatus 30 which may be used to form a flat charge 36 (FIG. 3) into a part 38 such as a contoured structural member of the type shown in FIGS. 6 and 7. In this example, the part 38 is a hat shaped stiffener that may be used, for example and without limitation, in the aircraft industry to stiffen a variety of structures such as wings, spars, stabilizers, etc. In the illustrated example, the part 38 includes a central hat section 40, and a pair of outwardly extending flanges 42. As shown in FIG. 7, the part 38 is contoured at 45 along its longitudinal axis 43. As used herein, "contoured" and "highly contoured" mean a contour or curvature in the direction of the length of the charge that is sufficient in its severity to result in potential wrinkling or bunching between the plies forming the flat charge 36 when using conventional forming techniques. As will be discussed below, wrinkling of the composite charge 36 used to form the part 38 is reduced or eliminated by forming the entire member at once starting at the inner or smaller radius 38a and, while holding the outer die set stationary, moving the inner dies outward towards the larger radius. Optionally, wrinkling of the composite charge 36 used to form the part 38 is reduced or eliminated by commencing forming at the steepest part 38a of the contour 45, and then proceeding to adjacent parts 38b, 38c that are progressively less steep, so that tension on the charge 36 is maintained substantially throughout the forming process. As used herein, "steep" and steepest" refer to the area of the part 38 that has the greatest rate of change in shape, such as, for example and without limitation, the sharpest or tightest part of a curve.

The composite charge 36 may comprise multiple plies (not shown) of prepreg materials which may be knitted or woven fabrics pre-impregnated with a suitable resin binder. However, the disclosed method and apparatus may also be useful in forming dry charges where the fabrics have been pre-treated with resin materials that may cause the plies to wrinkle during the forming process. Similarly, the disclosed method and apparatus may be useful in forming multi-ply charges of dry fabric having "tackifiers" that tack the fabric plies together in a desired shape and/or alignment prior to resin infusion. Also, although the disclosed embodiments have been illustrated in connection with the forming of composite charges 36, they may also be useful in forming charges comprising other multi-ply materials having a tendency to wrinkle during the forming of highly contoured parts.

Referring now particularly to FIGS. 2-5, the apparatus 30 broadly comprises a forming machine 30a and a portable carrier 30b. The apparatus 30 includes first and second dies 32, 34 respectively between which the flat charge 36 may be placed in order to form the charge 36 into a contoured part 38 (FIG. 6). The apparatus 30 may employ an orthogonal x,y,z coordinate system 44 in which the x-axis corresponds to the longitudinal direction of the charge 36, and the formed contour extends in the y direction.

The first die 32 is mounted on the portable carrier 30b, while the second die 34 is mounted on the forming machine 30a. The portable carrier 30b comprises a wheeled frame 62 having a beam 60 mounted thereon. The first die 32 comprises a plurality of individual die portions 32a that are individually displaceable relative to each other and thus form a changeable die contour 37. The die portions 32a are mounted on a flexible die tray 56 formed of any suitable flexible material, such as thin aluminum or a synthetic material. The die tray 56 is supported on a plurality of spaced apart push rods 58 that are each mounted for vertical displacement on the beam 60. As will be discussed later in more detail, the portable carrier 30b may be used to transport the first die 32 supporting a formed part 38 therein to a location where the part 38 may be transferred to either cure tooling (not shown) or placed upon a substrate, such as an uncured skin (not shown).

The second die 34 is mounted on the bottom of a flexible backing plate 48 which may comprise, for example and without limitation, relatively thin aluminum or other similar metals or flexible synthetic materials. The backing plate 48 is mounted on a plurality of second anvils for sliding movement along the x axis by a series of slide plates 54 that will be discussed in more detail below. The second anvils 80 are secured to brackets 76 mounted on corresponding slide arms 66. The slide arms 66 are mounted for independent vertical sliding movement along the y-axis, on vertical supports 70 which are in turn secured to a frame 64. The vertical supports 74 are displaceable by the shape forming actuators 75 along the y-axis.

The first anvils 78 are respectively secured to the slide arms 68 by brackets 81. The slide arms 68 are slideably mounted on the vertical supports 70 for movement along the y-axis. The support arms 68 are also secured to vertical supports 72 which are displaceable along the y-axis by contour control actuators 77. Thus, from the forgoing description, it can be appreciated that the first and second anvils 78, 80 respectively, are moveable toward and away from each other, respectively driven by the actuators 77, 75.

Referring now particularly to FIGS. 8-11 the flexible backing plate 48 includes a plurality of sets of guide supports 52 which guide the relative sliding movement between the slide plates 54 and the backing plate 48 in the direction of the x-axis 44. Arms 55 on the ends of later discussed pivot pins 51 mounted on side plates 54 may engage one of the guide supports 52 to limit the relative displacement between the slide plates 54 and the backing plate 48.

Figure 10:
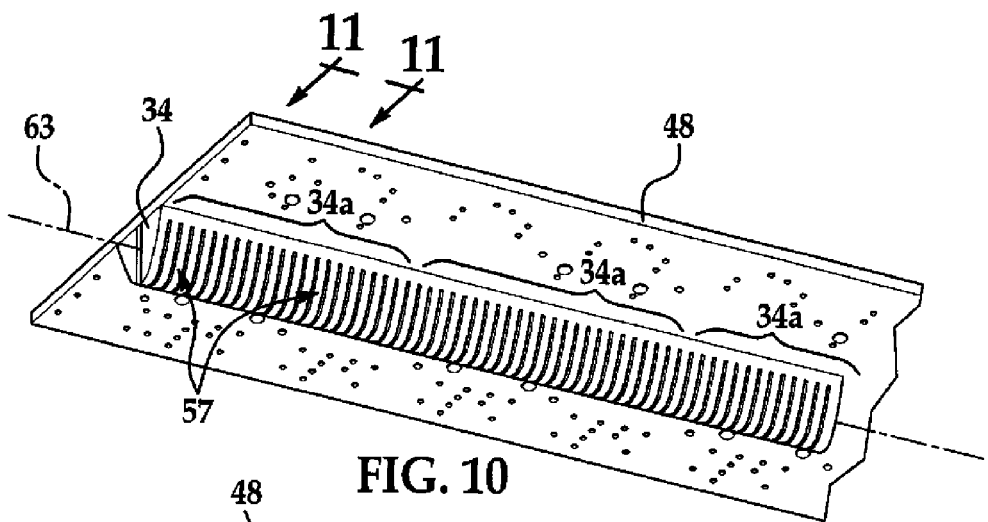
FIG. 10 is a perspective illustration of the first die.
Figure 11:
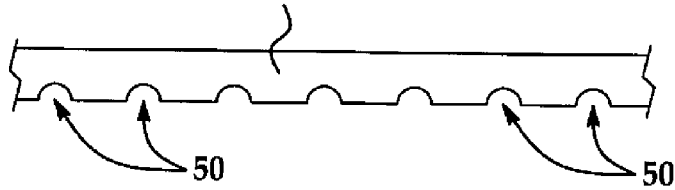
FIG. 11 is a view in the direction 11-11 shown in FIG. 10, and illustrating additional details of the backing plate.

As shown in FIG. 10, the second die 34 may include a plurality of longitudinally spaced, transverse grooves or slots 57 formed therein which provide the second die 34 with the flexibility necessary to bend and/or twist along its longitudinal axis 63 in order to conform the second die 34 to a particular contour. In the illustrated example, the second die 34 is formed of aluminum, however a variety of other suitable materials may be employed including other metals and plastics. Depending upon the flexibility of the materials used to fabricate the die 34, the grooves 57 may not be necessary in some embodiments. While the second die 34 has been illustrated as being a single flexible member, the second die 34 may also be formed of a plurality of individual pieces.

The backing plate 48 may include a plurality of longitudinally spaced, transversely extending grooves or slots 50 therein which reduce the thickness of the backing plate 48 at spaced apart locations that provide the backing plate 48, and thus the second die 34, with the necessary flexibility to bend and/or twist in order to form highly contoured part shapes.

Figure 12:
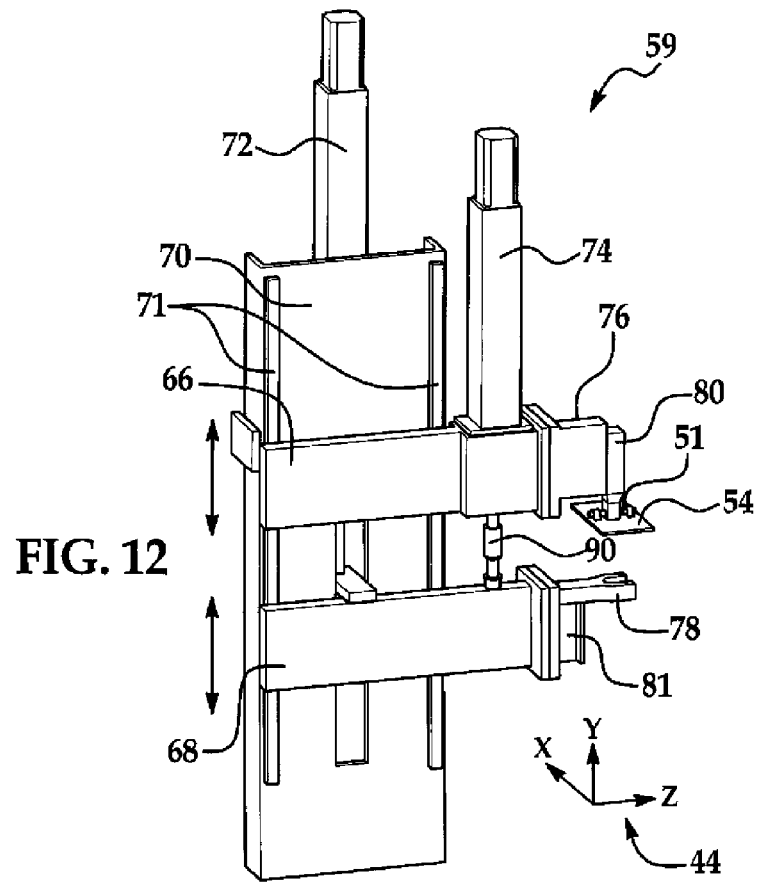
FIG. 12 is a perspective illustration of a slide assembly forming part of the apparatus shown in FIGS. 2-4.

FIG. 12 illustrates additional details of a slide assembly 59. Each of the slide arms 66, 68 may be mounted for vertical sliding movement on the vertical support 70 by means of slide rails 71 or other suitable mounting arrangements. The slide arms 66, 68 are vertically aligned so that the first anvil 78 remains aligned beneath the second anvil 80 as the slide arms 66, 68 move relative to each other. A load cell 90 may be placed between or more one sets of the slide arms 66, 68 in order to measure the force applied to the dies 32, 34 through the anvils 78, 80. Movement of the anvils 78, 80 toward each other during the forming process compresses the load cell 90 which responds by generating an electrical signal representing the compression force being applied by the anvils 78, 80 to the charge 36. The second anvils 80 are pivotally connected to the slide plate 54 by pivot pins 51.

Figure 13:
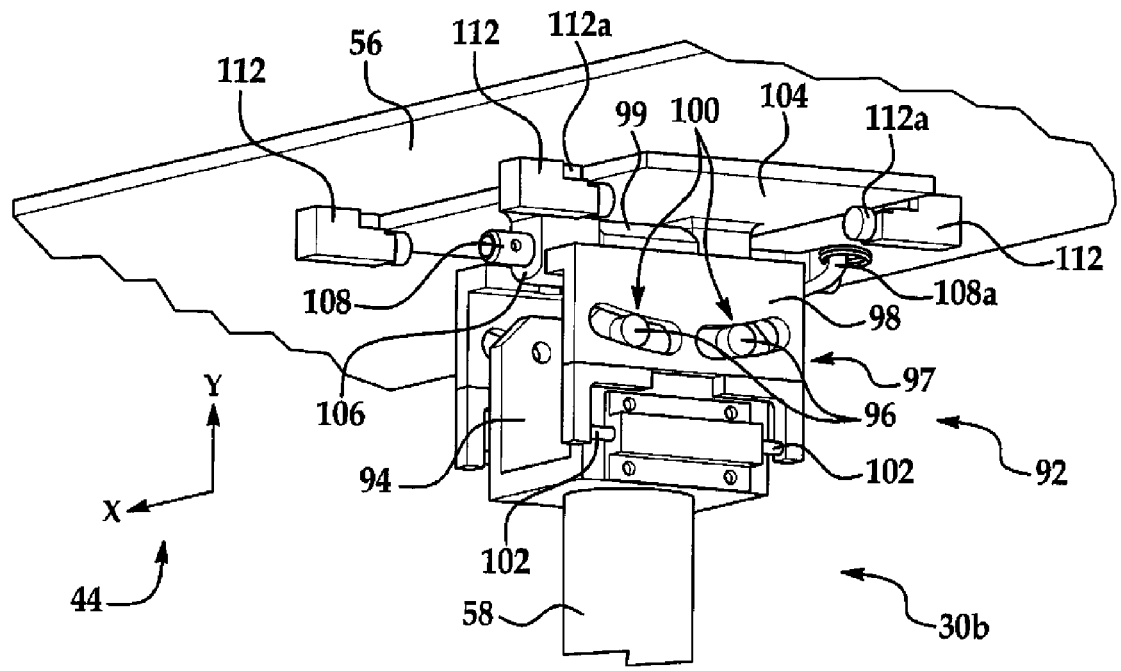
FIG. 13 is a perspective view showing details of the connection between the die tray and a support rod.
Figure 14:
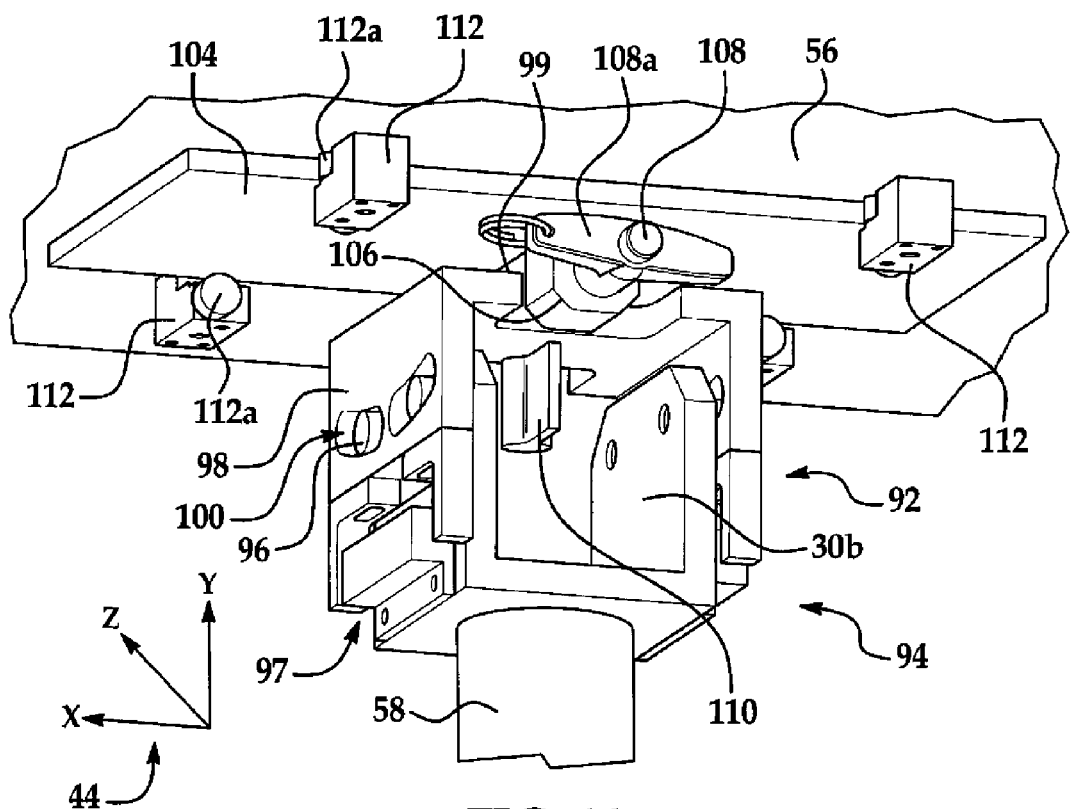
FIG. 14 is a perspective view of the connection shown in FIG. 12 but viewed from a different angle.

Attention is now directed to FIGS. 13 and 14 which depict details of a self-adjusting mounting assembly 92 used to mount the die tray 56 on each of the push rods 58. An upper U-shaped bracket 94 is secured to the upper end of the push rod 58 and includes outwardly depending pivot pins 96. A lower U-shape bracket 98 is pivotally mounted on the upper bracket 94 by the pivot pins 96 which are received within curved slots 100 in the lower bracket 98. A series of spring elements 102 positioned between brackets 94, 98 bias the upper bracket 98 to a centered position 97 shown in FIGS. 13-15, however a variety of other biasing means (not shown) may be employed in lieu of the spring elements 102. A latch member 110 is secured to the upper bracket 98 and extends downwardly into the spaced surrounded by the lower bracket 94.

Slide plate 104, and thus the tray 56, are releasably connected to the upper bracket 98 by means of a hinge pin 108 that extends through ears 106 on the slide plate 104 and a portion 99 of the upper bracket 98. The hinge pin 108 may include a handle 108a that allows easy removal of the hinge pin 108. Removing the hinge pin 108 releases the tray 56 from the portable carrier 30b, thus allowing the tray 56 to be used in either placing the formed part 38 on a substrate (not shown), or transporting the formed part 38 to a curing die (not shown), or to be replaced with another tray 56 having a different die.

The tray 56 may slide on the upper surface of the plate 104 which remains stationarily connected to the upper bracket 98. Four sets of guides 112 are mounted on the tray 56 and include rollers 112a that engage the bottom and edges of the plate 104 in order to maintain alignment of the tray 56 relative to the plate 104 during sliding movement of the tray 56.

Figure 15:
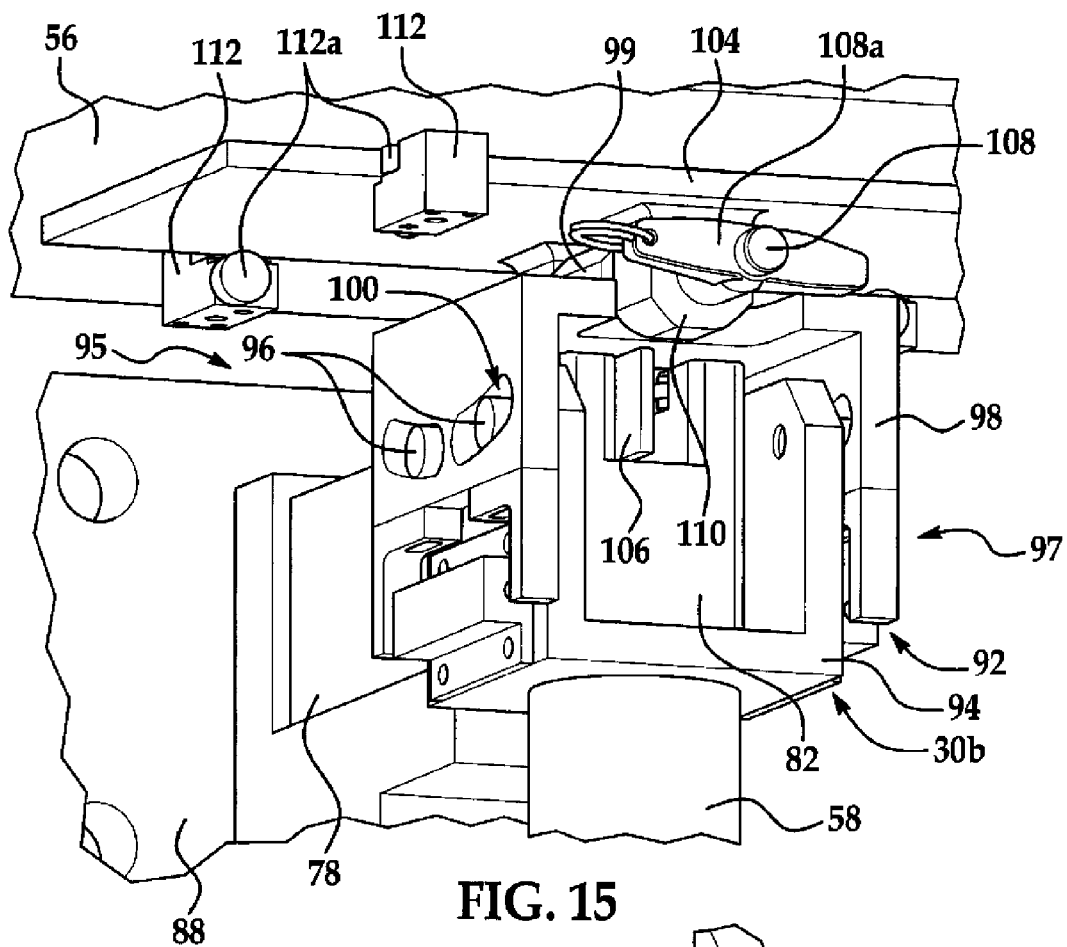
FIG. 15 is a perspective view similar to FIG. 14 but showing a second anvil locked to the connection.
Figure 16:
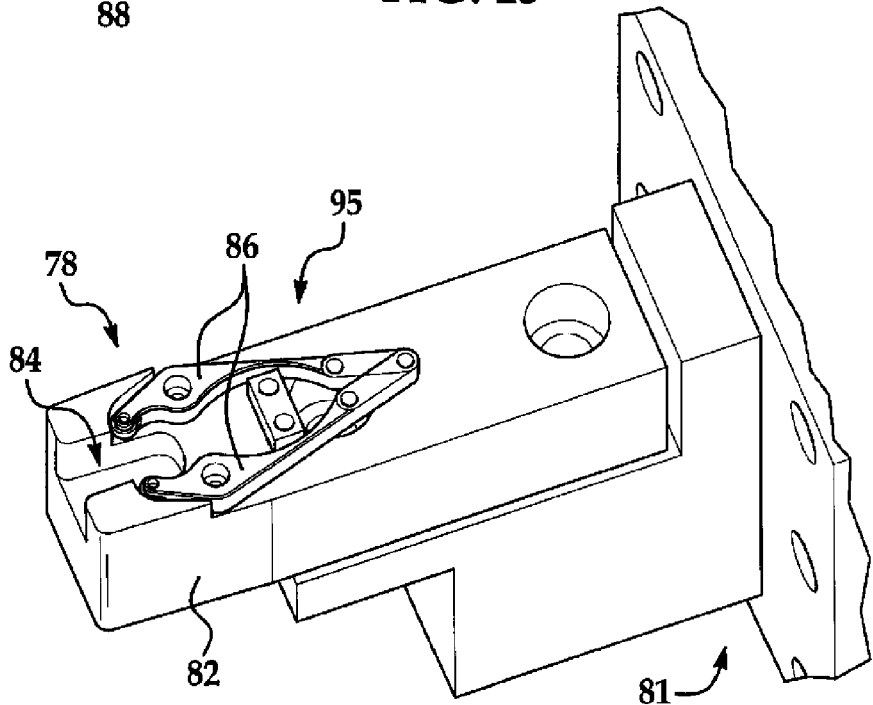
FIG. 16 is a perspective illustration of the second anvil and showing details of the coupling.

Reference is now also made to FIGS. 15 and 16, which depict details of the releasable coupling 95 previously mentioned in connection with FIG. 1. The first anvil 78 includes a projecting anvil arm 82 provided with a slot 84 in its outer end which complementarily receives the latch member 110. A pair of gripper arms 86 pivotally mounted on the anvil arm 82 move from their open position shown in FIG. 16, to a closed position locking the latch member 110 therebetween, thereby fixing the position of the first die 32 beneath the second die 34.

Figure 17:
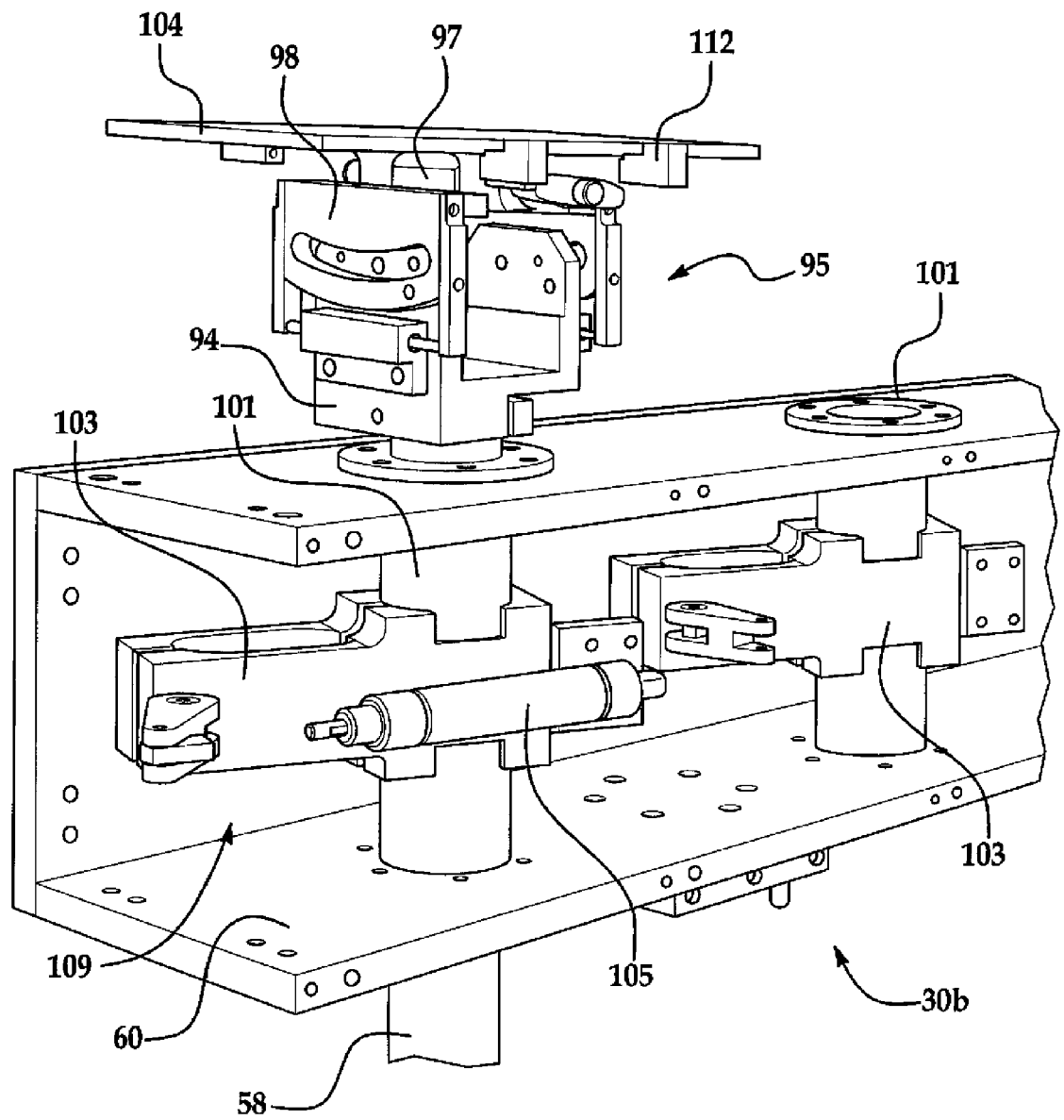
FIG. 17 is a perspective view illustrating a clamping mechanism used to lock the contour of the second die.

FIG. 17 illustrates locking mechanisms 109 which lock-in the contour of the first die 32 after the part 38 has been formed, so that the contoured first die 32 continues to conformally support the part 38 as it is being transported on the portable carrier 30b. Flexible, compressible sleeves 101 are mounted on and pass vertically through the beam 60. The push rods 58 respectively pass through and are slidable within the sleeves 101. Each of the locking mechanisms 109 includes a pair of opposing clamps 103 hinged together and controlled by a pneumatic or hydraulic cylinder 105 which generates a force acting to draw the clamps 103 together, thereby applying clamping pressure to the sleeve 101. The clamping pressure applied to the sleeves 101 by the clamps 103 compress the sleeves 101 to clamp the push rods 58 in place, in turn locking the die portions 32a of the first die 32 against relative movement. In other words, locking the push rods 58 in place fixes the contour of the first die 32.

Referring now also to FIGS. 1-5 and 12, in operation, the portable carrier 30b is moved into proximity with the forming machine 30a and the push rods 58 are guided into and locked to the first anvils 78. A flat charge 36 may be placed on the first die 32, following which the contour of the first die 32 is configured to a desired shape using the contour control actuators 77 to displace the vertical supports 72. Displacement of each of the vertical supports 72 results in the slide arm 68 moving either up or down, which in turn displaces the corresponding first anvil 78 that is locked to one of the push rods 58. Displacement of the push rods 58 by the first anvils 78 flexes the die tray 56 which in turn displaces the die portions 32a either up or down to form a desired contour substantially matching the contour of the part 38 to be formed. Thus, it may be appreciated that the contour control actuators 77 control the contour 37 assumed by the first die 32. The pivot pins 96 allow the charge 36 to twist about its longitudinal axis 43 (FIGS. 3, 6 and 7) during the forming process, and the sliding plate 104 provides arch length differences with constant actuator spacing, and also provides additional stiffness to the forming tray 56.

The first die 32 having been configured to a desired contour, the forming process is then commenced in which the second anvils 80 independently displace portions of the upper backing plate 48 which in turn displaces portions 34a of the flexible, second die 34. As will be described in more detail below, as the second die 34 is closed against the contoured first die 32, portions of the charge 36 are progressively formed to the desired contour by sequentially displacing second die portions 34a in a manner that maintains the charge in tension during the forming process.

As previously discussed, maintaining the charge in tension may reduce the possibility of wrinkling of the charge 36 during forming. The disclosed embodiments maintain the charge 36 in tension during the forming process by forming the charge 36 from the top down or the bottom up, depending upon the direction of a particular contour on the part 38. By forming from the top down or bottom up beginning at the steepest part of the contour, the plies of the charge 36 are constantly being formed toward a large radius of the contour, thus maintaining the plies in tension.

Figure 18:
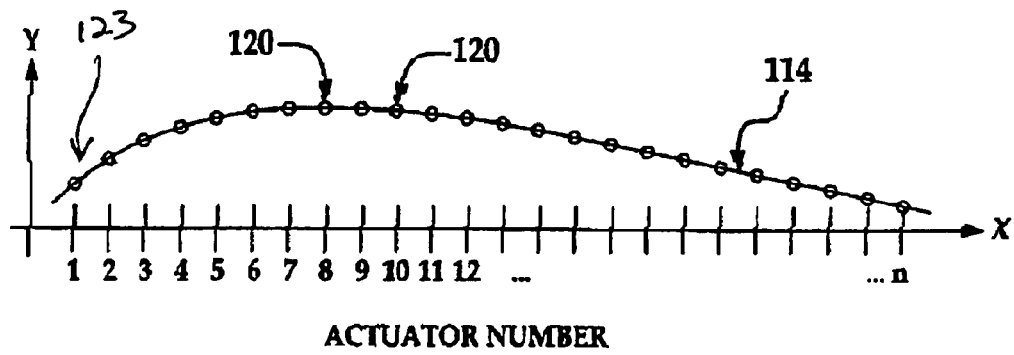
FIGS. 18-20 are graphs useful in explaining the forming sequence.
Figure 19:
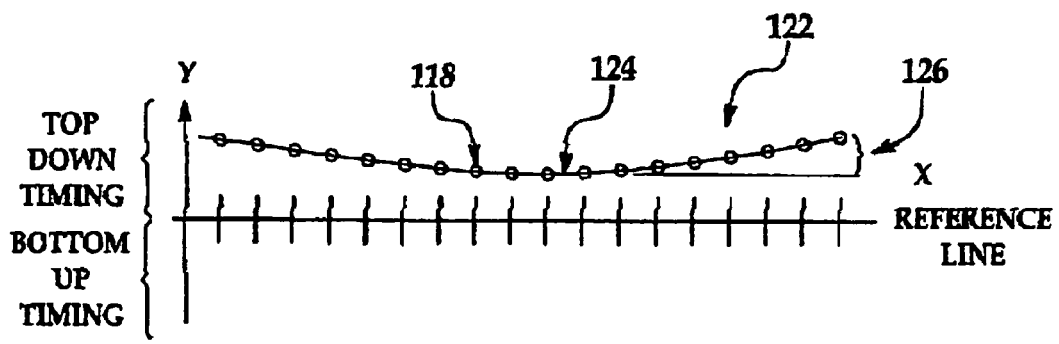
Figure 20:
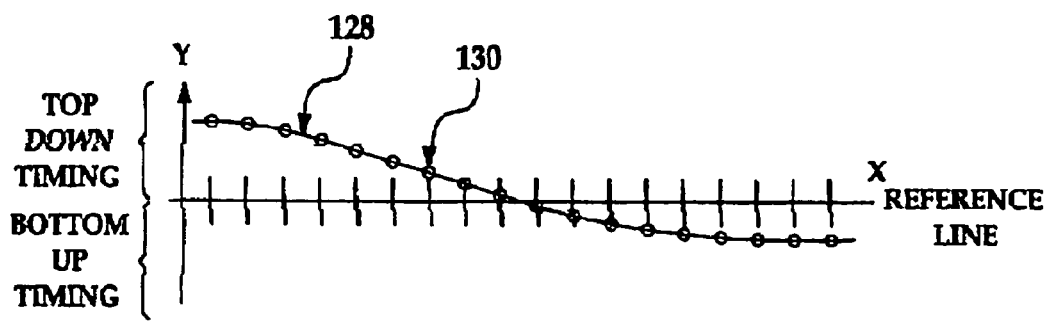

Attention is now directed to FIG. 18-20 which diagrammatically illustrate the order in which the shape forming actuators 75 may be sequentially actuated to progressively form the charge 36 such that the forming progresses from the steepest to progressively less steep areas of the contour. In other words, the forming progresses from the areas having the most contour to those having the least contour. In FIGS. 18-20, the x-axis represents the position of the shape forming actuators 75, while the y-axis indicates the amount of displacement of the actuators 75.

In FIG. 18, the numeral 114 designates an engineering defined reference line passing through the displacement points 120 of the shape forming actuators 75, and thus substantially conforms to the contour of the part 38 after forming. FIG. 18 represents bottom up forming in which the upper and lower actuators 75, 77 respectively, are positioned at the points 120 represented in the figure. Forming of hat section 40 occurs as the upper die 34 is held stationary and the lower die portions 32a move upwards. As an optional sequence, forming begins at the steepest part 123 of the contour and progresses sequentially toward the ends of the charge 36. FIG. 19 illustrates another reference line 122 corresponding to a different contour shape in which forming is commenced near the middle of the charge 36, as shown by the numeral 124 where shape forming actuators 75 near the center of the charge 36 engage and form the area that has the greatest contour before the remaining shape forming actuators 75 progressively form the areas that have less contour. Reference lines above the x-axis represent top down forming, while a reference line below the x-axis indicates bottom up forming. The numeral 126 designates the total starting delay between the forming actuators 75 near the center of the charge 36 compared to those at the outer extremities of the charge 36.

FIG. 20 shows a reference line 130 corresponding to a compound, contoured part 38 having both convex and concave curves. In this example, forming is commenced by the more centrally located shape forming actuators 75 and the forming process progresses from the center using both top down forming and bottom up forming to form the convex and concave shapes of the part 38.

Figure 21:
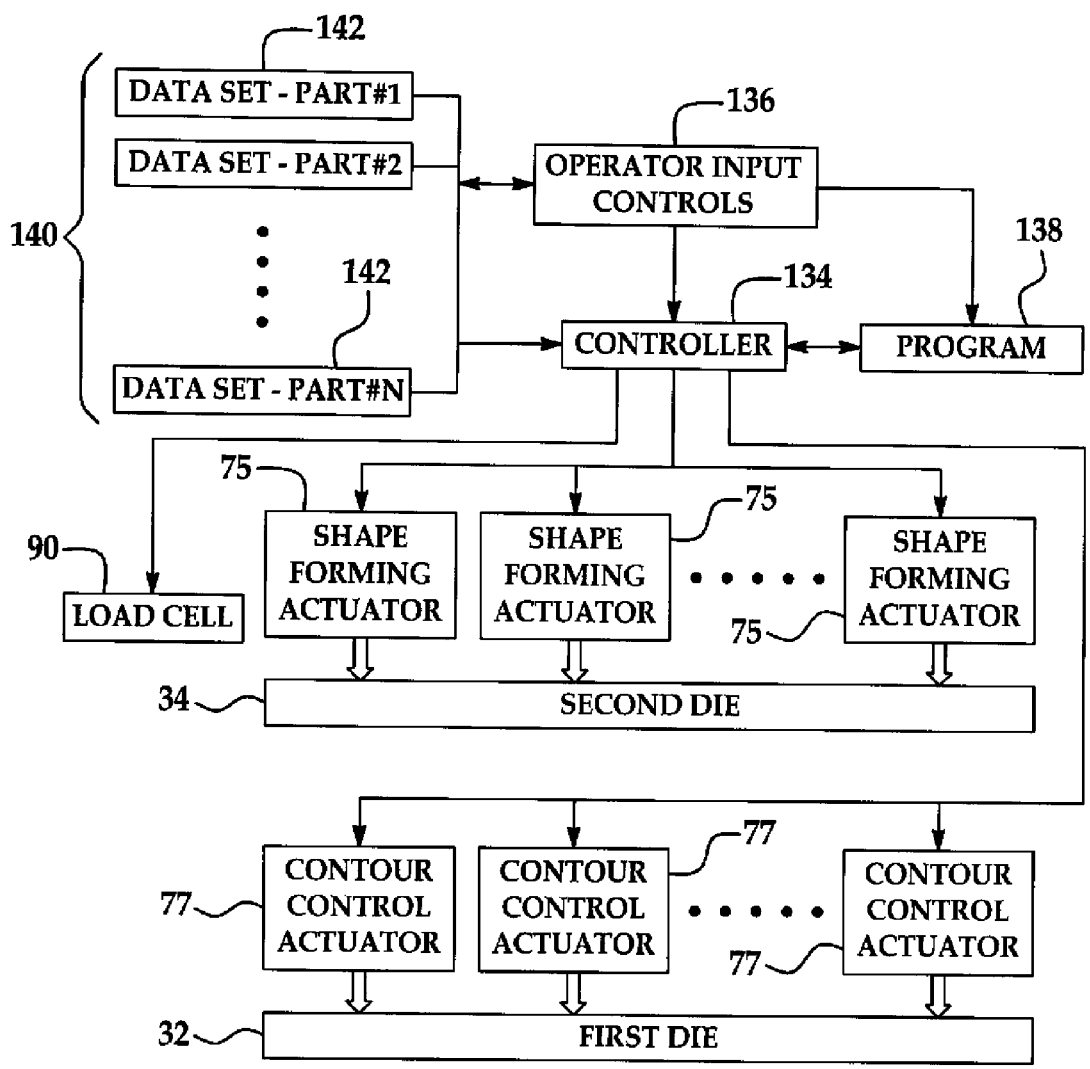
FIG. 21 is a functional block diagram of the control system forming part of the apparatus.

Attention is now directed to FIG. 21 which depicts, in functional block form, a control system forming part of the apparatus 30 for forming highly contoured composite parts 38. The control system includes a controller 134 which may be a PC (portable computer) or a PLC (programmable logic controller) that controls the operation of the contour control actuators 77 and the shape forming actuators 75. The controller 134 may access files 140 containing a plurality of data sets 142. The data sets 142 contain data representing the contours for each of a plurality of parts 38. The controller 134 also uses a control program 138 which may include an algorithm that determines how the forming should progress and the sequential operation of the shape forming actuators 75 necessary to maintain the charge in tension during forming. A set of operator input controls 136 allows an operator to input or change any of the data sets 142 as well as the control program 138 with operator defined values. The controller 134 may also receive signals from the load cell 90 which may be used to monitor the pressure applied to the charge 36 by the actuators 75, 77.

Based on a part number selected by an operator using the operator input controls 136, the controller 134 selectively actuates the contour control actuators 77 in order to configure the first die 32 to a contour corresponding to that of the selected part 38. The contour of the first die 32 having been configured, the controller 134 then selectively controls the shape forming actuators 75 to carry out progressive forming of the charge 36 using either top down or bottom up forming, or a combination of both, as described above. From the foregoing, it may be appreciated that automated control and algorithms, the apparatus 30 may form a flat charge 36 into a part 38 from the bottom up or top down or any combination in between. This allows any given part 38 to change form without wrinkles regardless of whether it is bent in a convex or concave direction or a combination of both anywhere along its length.

FIG. 22 broadly illustrates the steps of the forming method described above. Beginning at 144, a flat charge 36 is placed between the upper and lower dies 32, 34. Next at 146, the charge 36 is formed corresponding to the contour of the part 38 without forming the cross sectional profile. The flat charge 36 is formed to the contour of the centerline 43 (see FIG. 7) of the part 38 by closing the dies 32, 34 until they are separated by the thickness of the charge 36, and then displacing the die portions 32a, 34a in a manner that shapes or "bends" the flat charge 36; at this point, the cross section of the charge 36 is still flat, but the profile of the charge 36 is that of the contoured centerline 43. Finally, at 148, the cross sectional profile of the charge 36 is formed starting at the smallest radius (38a in FIG. 7) and forming towards the larger radius of the part 38. The forming rate can be controlled by the actuators 75, 77 being controlled to move at the same speed, or to move at different speeds such that the forming is completed for all actuators at the same time, or a combination both timing and speed Attention is now directed to FIG. 23 which depicts further details of the method for forming highly contoured composite parts 38. Beginning at step 150, a flat charge 36 is laid up on the first die 32. At 152, an operator may select and input the number of a particular part that is to be formed. Data describing the shape and dimensions for a plurality of part numbers may be stored at step 154. Then, after the operator has input an identifier, such as without limitation, a part number, at 152, the controller 134 may retrieve data from storage for the selected part number, as shown at 156. At step 158, based on the retrieved part data, the controller 134 adjusts the contour of the first die 32 to substantially match that of the selected part through individual operation of the contour control actuators 77. Next, at 160, the controller 134 uses the retrieved part data and an algorithm forming part of a program 138 to calculate the displacement and sequence of movement for the second die portions 34a that will result in the charge 36 remaining in tension during the forming process.

At this point, the first and second dies 32, 34 respectively have been readied for forming. At 162, the controller 134 controls the shape forming actuators 75 to sequentially displace the second die portions 34a so that the charge 36 is progressively formed while tension is maintained on the charge throughout the forming process. When the first and second dies 32, 34 have been completely closed, the charge is formed to shape at step 164.

Attention is now directed to FIG. 24 which illustrates the manner in which the first die 32 and die tray 56 may be employed in a method for locating and placing a formed part 38 on a substrate, such as an uncured composite skin 70. As previously described, following the forming process, the tray 56 may be disconnected from the portable carrier 30b by removing the hinge pin 108 (see FIG. 15). The tray 56 may then be mounted on an arm 172 or similar device forming part of a placement machine 174 such as, without limitation, a robot. With the die tray 56 secured to the arm 172, the placement machine 174 may be used to precisely locate and then place the formed part 38 on the skin 170, following which the die tray 56 and die 32 are retracted and returned to the portable carrier 30b.

Figure 25:
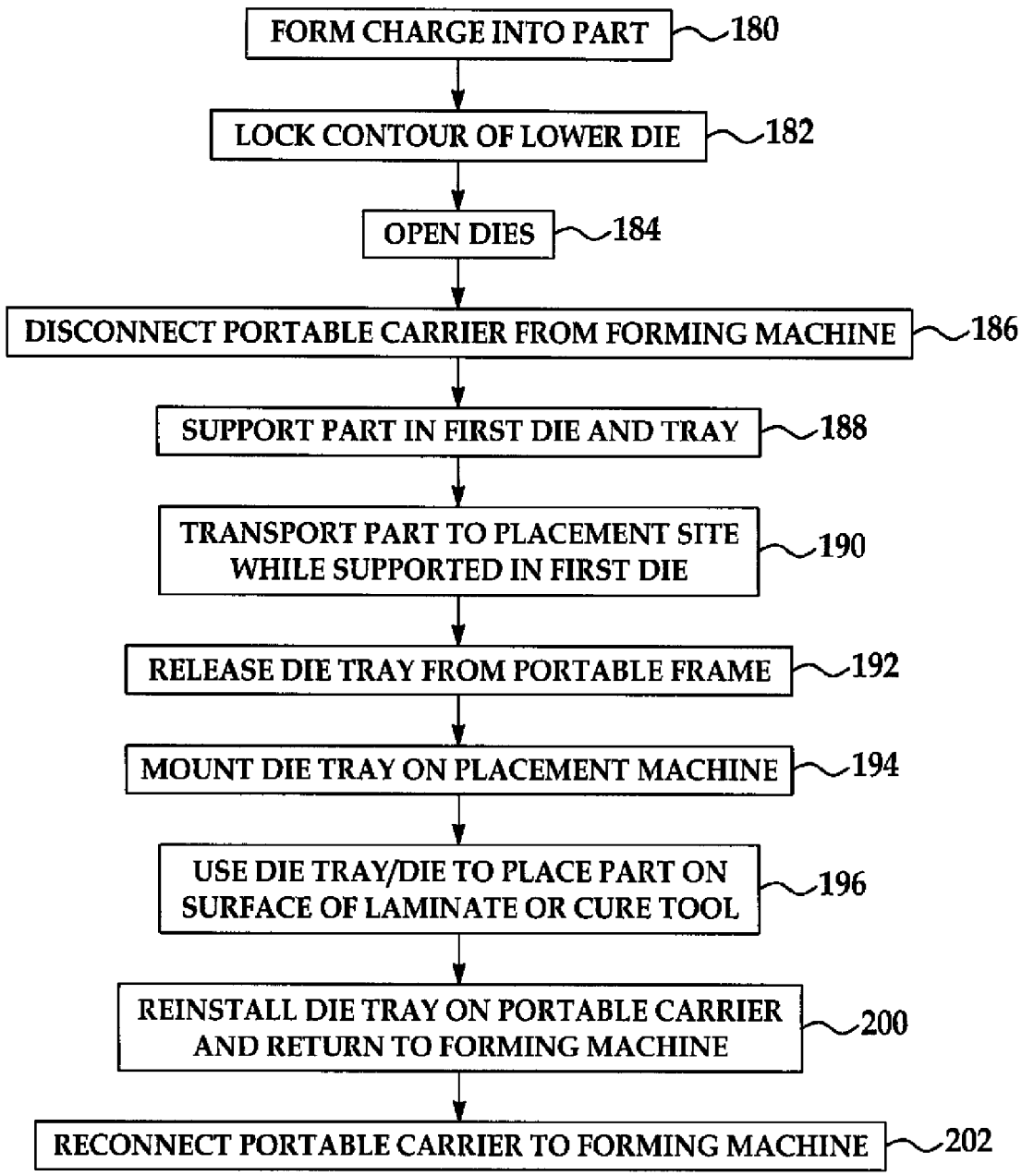
FIG. 25 is a flow diagram illustrating a method of transporting the formed part to a location where it is placed on a substrate.

FIG. 25 illustrates a method for fabricating a composite part that employs the portable carrier 30b previously described. Commencing at 180, a flat charge 36 is formed into a part 38. The contour of the first die 32 is locked in place at 182, following which the dies 32, 34 may be opened at 184. At this point, as shown at 186, the portable carrier 30b is uncoupled from the forming machine 30a, allowing the carrier 30b to be transported away from the forming machine 30a. As shown at 188, the formed part 38 is supported in the first die 32 on the tray 56 as the portable carrier 30b is uncoupled and moved away from the forming machine 30a. At step 190, the portable carrier 30b is used to transport the formed part 38 to a placement site while being supported in the first die 32. At the placement site, as shown at step 192, the die tray 56 is released from the portable frame 30b by removing the hinge pin 108. Next at 194, the die tray 56 may be connected to a placement machine 174 (FIG. 23). At 196, the placement machine 174 uses the die tray 56 and first die 32 to place the formed part onto a substrate such as the skin 170 shown in FIG. 23, or alternatively onto a cure tool (not shown). In some applications, it may be possible to use the die tray 56 and first die 32 to hold the formed part 38 during curing. At 200, the die tray 56 may be reinstalled on the portable carrier 30b, following which the tray 56 and first die 32 may be returned to the forming machine 30a using the portable carrier 30b. At step 202, the portable carrier 30b is re-coupled to the forming machine 30a.

Figure 26:
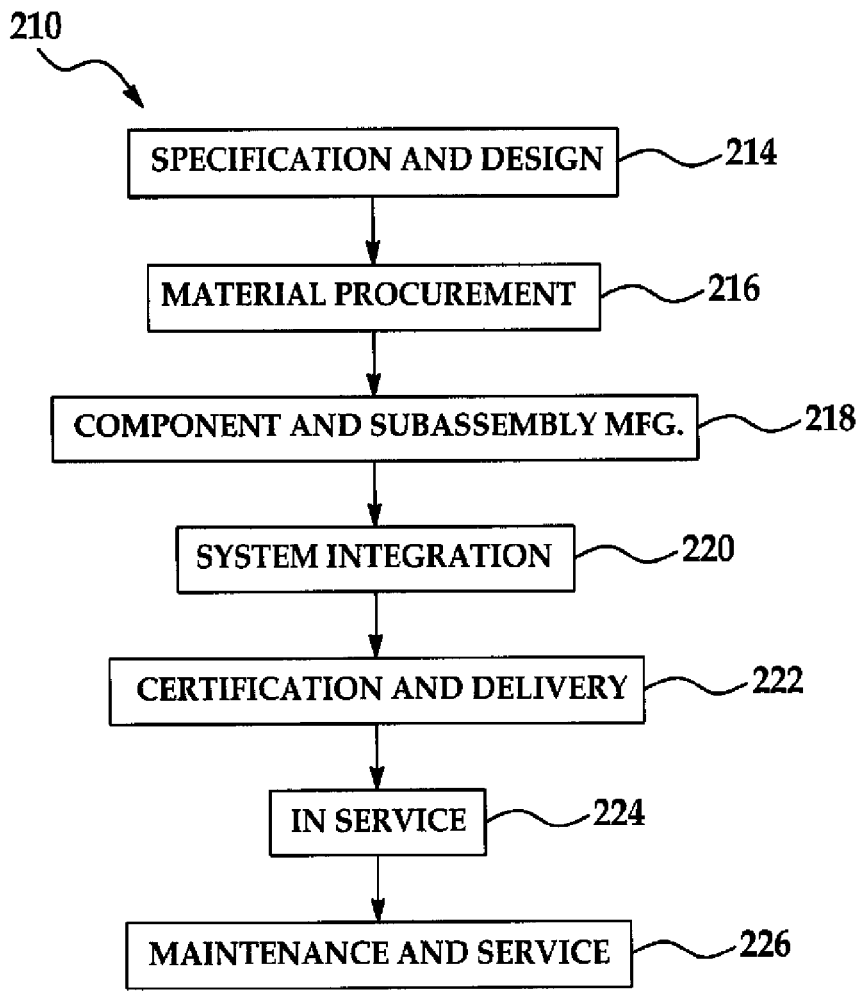
FIG. 26 is a flow diagram of aircraft production and service methodology.
Figure 27:
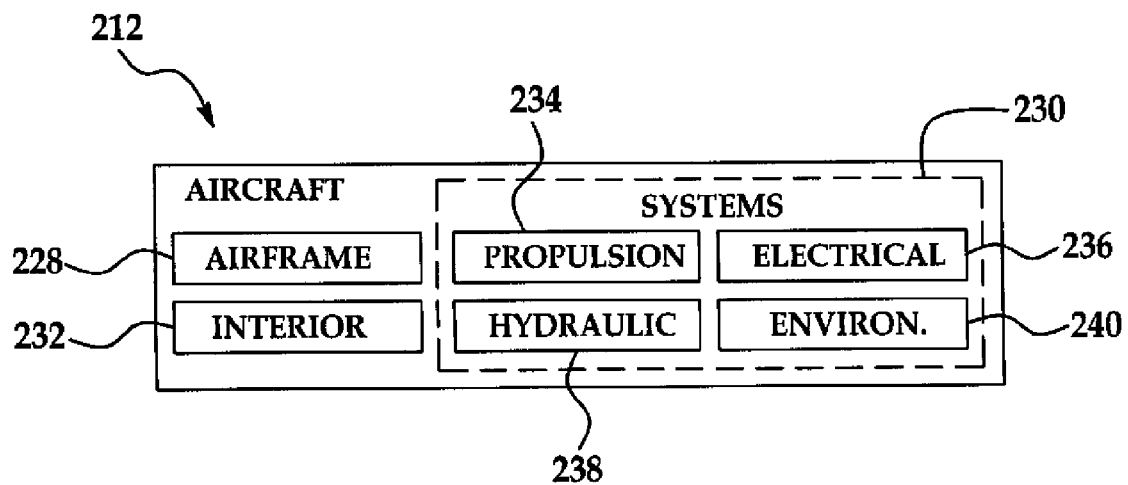
FIG. 27 is a block diagram of an aircraft.

Embodiments of the disclosure may find use in a variety of potential applications, particularly in the transportation industry, including for example, aerospace, marine and automotive applications. Thus, referring now to FIGS. 26 and 27, embodiments of the disclosure may be used in the context of an aircraft manufacturing and service method 210 as shown in FIG. 26 and an aircraft 212 as shown in FIG. 27. During pre-production, exemplary method 210 may include specification and design 214 of the aircraft 212 and material procurement 216. During production, component and subassembly manufacturing 218 and system integration 220 of the aircraft 212 takes place. Thereafter, the aircraft 212 may go through certification and delivery 222 in order to be placed in service 224. While in service by a customer, the aircraft 212 is scheduled for routine maintenance and service 226 (which may also include modification, reconfiguration, refurbishment, and so on).

Each of the processes of method 210 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 27, the aircraft 212 produced by exemplary method 210 may include an airframe 228 with a plurality of systems 230 and an interior 232. Examples of high-level systems 230 include one or more of a propulsion system 234, an electrical system 236, a hydraulic system 238, and an environmental system 240. Any number of other systems may be included. Although an aerospace example is shown, the principles of the disclosure may be applied to other industries, such as the marine and automotive industries.

Systems and methods embodied herein may be employed during any one or more of the stages of the production and service method 210. For example, components or subassemblies corresponding to production process 218 may be fabricated or manufactured in a manner similar to components or subassemblies produced while the aircraft 212 is in service. Also, one or more apparatus embodiments, method embodiments, or a combination thereof may be utilized during the production stages 218 and 220, for example, by substantially expediting assembly of or reducing the cost of an aircraft 212. Similarly, one or more of apparatus embodiments, method embodiments, or a combination thereof may be utilized while the aircraft 212 is in service, for example and without limitation, to maintenance and service 226.

Although the embodiments of this disclosure have been described with respect to certain exemplary embodiments, it is to be understood that the specific embodiments are for purposes of illustration and not limitation, as other variations will occur to those of skill in the art.

What is claimed is:

1. Apparatus for forming a composite charge into a contoured part, comprising:
   a first die and a second die between which the charge may be formed,
   the first die having a plurality of first die portions individually displaceable and forming a changeable die contour;
   means for mounting the first die portions for freedom of movement in multiple directions;
   a plurality of first actuators for respectively displacing the first die portions; and,
   a programmed controller for controlling the first actuators to displace the first die portions to form a desired contour.

2. The apparatus of claim 1, wherein the composite charge is a substantially flat charge, and the second die includes a plurality of second displaceable die portions, the apparatus further comprising:
   a plurality of second actuators coupled with the controller for respectively displacing the second displaceable die portions to form the charge against the first die; and
   a program used by the controller to calculate a sequence for operating the second actuators that substantially maintains the charge in tension as the charge is being formed.

3. The apparatus of claim 2, further comprising:
   a plurality of first anvils against which the first die portions may react; and,
   a plurality of second anvils against which the second die portions may react.

4. The apparatus of claim 3, further comprising:
   a frame; and,
   means on the frame mounting the pluralities of first and second anvils for displacement toward and away from each other.

5. The apparatus of claim 2, further comprising:
   a flexible tray on which the first die portions are mounted; and
   a flexible backing plate on which the second die portions are mounted.

6. The apparatus of claim 1, further comprising:
   a portable carrier having the first die mounted thereon;
   a frame having the second die mounted thereon; and,
   a releasable coupling for releasably coupling the portable carrier with the second frame during the forming of the charge, the coupling being releasable to allow the portable carrier to be separated from the frame.

7. The apparatus of claim 1, wherein:
   the mounting means includes a flexible tray, and
   the first die portions are mounted on the flexible tray.

8. Apparatus for forming a composite charge into a contoured part, comprising:
   a first die and a second die between which the charge may be formed,
   the first die having a contour corresponding to the contour of the part to be formed, wherein the first die includes a flexible die tray and a plurality of die portions mounted on the die tray;
   the second die including a plurality of die portions; and,
   means for closing the die portions of the second die against the first die in a predetermined sequence that substantially maintains tension on the composite charge as the charge is being formed.

9. The apparatus of claim 8, further comprising:
   a plurality of rods connected to and supporting the die tray, and
   means for displacing the rods independently of each other to change the contour of the first die.

10. The apparatus of claim 8, further comprising:
    a portable carrier having the first die mounted thereon;
    a frame having the second die mounted thereon: and
    means for releasably coupling the portable carrier with the frame.

11. The apparatus of claim 8, wherein the means for closing the die portions of the second die includes:
    a plurality of actuators for respectively displacing the die portions, and
    a controller for controlling the operation of the actuators.

12. The apparatus of claim 11, wherein the means for closing the die portions of the second die includes:
   a set of data defining the contour of the part, and
   a set of programmed instructions defining an algorithm and used by the controller to control the operation of the actuators.

13. The apparatus of claim 8, wherein the first die includes a plurality of die portions, and the apparatus further comprises:
   means for mounting the die portions of the first die for displacement relative to each other and allowing the contour of the first die to be changed,
   a plurality of actuators for respectively displacing the die portions of the first die, and
   control means including a controller and a set of programmed instructions for controlling the operation of the actuators.

14. Apparatus for forming a composite charge into a shaped part, comprising:
   a forming machine for forming the composite charge;
   a portable carrier for transporting the shaped part away from the forming machine;
   a first die and a second die between which the charge may be formed, the first die being mounted on the portable carrier, and the second die being mounted on the forming machine, wherein the first die includes a plurality of individually movable portions for reconfiguring the contour of the first die, and including means on the portable carrier for locking the plurality of individually movable portions against movement, thereby fixing the contour of the first die; and,
   means for releasably coupling the portable carrier with the forming machine.

15. The apparatus of claim 14, wherein the portable carrier includes:
   a frame, and
   a tray supported on the frame, the first die being mounted on the tray.

16. The apparatus of claim 15, wherein the portable carrier includes means for releasably coupling the tray with the frame and allowing the tray to be removed from the frame.

17. The apparatus of claim 16, wherein the releasable coupling means includes:
   a plurality of projections, and
   a plurality of grippers respectively associated with the projections for releasably gripping the projections.

18. The apparatus of claim 17, wherein:
   the plurality of projections are on the forming machine, and
   the plurality of grippers are on the portable carrier.

19. The apparatus of claim 14, wherein:
   the forming machine includes a plurality of anvils for respectively moving the die portions, and
   the releasable coupling means includes gripper on the anvils for gripping the portable carrier.

* * * * *